United States Patent
Mihara et al.

(10) Patent No.: US 9,779,056 B2
(45) Date of Patent: *Oct. 3, 2017

(54) COMMUNICATION SERVER, COMMUNICATION SYSTEM, PROGRAM, AND COMMUNICATION METHOD

(71) Applicant: RICOH COMPANY, LTD., Tokyo (JP)

(72) Inventors: Akihiro Mihara, Tokyo (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 261 days.

This patent is subject to a terminal disclaimer.

(21) Appl. No.: 14/425,171

(22) PCT Filed: Sep. 11, 2013

(86) PCT No.: PCT/JP2013/075210
§ 371 (c)(1),
(2) Date: Mar. 2, 2015

(87) PCT Pub. No.: WO2014/042278
PCT Pub. Date: Mar. 20, 2014

(65) Prior Publication Data
US 2015/0220480 A1  Aug. 6, 2015

(30) Foreign Application Priority Data

Sep. 12, 2012 (JP) .................. 2012-200912
Aug. 1, 2013 (JP) .................. 2013-160528

(51) Int. Cl.
*G06F 15/167* (2006.01)
*H04M 3/56* (2006.01)
(Continued)

(52) U.S. Cl.
CPC .......... *G06F 15/167* (2013.01); *H04L 63/104* (2013.01); *H04L 67/141* (2013.01);
(Continued)

(58) Field of Classification Search
CPC .................. G06F 15/167; H04L 63/104
(Continued)

(56) References Cited

U.S. PATENT DOCUMENTS

2006/0053208 A1  3/2006 Laurila et al.
2006/0053225 A1  3/2006 Poikselka et al.
(Continued)

FOREIGN PATENT DOCUMENTS

CA           1316610 C    4/1993
JP          2008-512911   4/2008
(Continued)

OTHER PUBLICATIONS

Extended European Search Report issued Jun. 1, 2015 in Patent Application No. 13836624.0.
(Continued)

*Primary Examiner* — Wing F Chan
*Assistant Examiner* — Leon Y Tseng
(74) *Attorney, Agent, or Firm* — Oblon, McClelland, Maier & Neustadt, L.L.P.

(57) ABSTRACT

A communication server includes a terminal management unit managing data identifying each of a plurality of communication terminals in association with group identification data identifying a group to which the communication terminals belong; a determination unit determining, when a session for transmitting and receiving content data is established between first and second communication terminals, whether group identification information sets of the first and the second communication terminals associated with the session are the same as each other based on the group identification data; and a report unit reporting, when the group identification information sets of the first and the second communication terminals are the same as each other, shared location information indicating a location of a shared
(Continued)

memory area shared between the first and the second communication terminals to the first and the second communication terminals associated with the session while the session is being established.

8 Claims, 21 Drawing Sheets

(51) Int. Cl.
  *H04L 29/06*   (2006.01)
  *H04L 29/08*   (2006.01)
  *H04N 7/15*   (2006.01)

(52) U.S. Cl.
  CPC .... *H04M 3/567* (2013.01); *H04M 2203/2044* (2013.01); *H04M 2203/558* (2013.01); *H04M 2203/6045* (2013.01); *H04N 7/15* (2013.01)

(58) Field of Classification Search
  USPC .......................................................... 709/213
  See application file for complete search history.

(56) References Cited

U.S. PATENT DOCUMENTS

| | | |
|---|---|---|
| 2006/0177066 A1 | 8/2006 | Han et al. |
| 2007/0076245 A1 | 4/2007 | Sugimoto et al. |
| 2008/0052514 A1 | 2/2008 | Nakae |
| 2013/0038676 A1 | 2/2013 | Tanaka et al. |
| 2013/0227015 A1 | 8/2013 | Mihara et al. |
| 2013/0242033 A1 | 9/2013 | Kato et al. |
| 2013/0242038 A1 | 9/2013 | Umehara et al. |

FOREIGN PATENT DOCUMENTS

| | | |
|---|---|---|
| JP | 2011-254453 | 12/2011 |
| JP | 2012-134941 | 7/2012 |
| JP | 2012-134944 | 7/2012 |
| JP | 2013-175059 | 9/2013 |
| WO | WO2005/093593 | 10/2005 |

OTHER PUBLICATIONS

International Search Report Issued on Dec. 17, 2013 in PCT/JP2013/075210 filed on Sep. 11, 2013.

FIG.6

| TERMINAL ID | GROUP NAME |
|---|---|
| 0001 | A1 |
| 0002 | A1 |
| 0003 | A2 |
| 0004 | A2 |
| 0005 | ... |
| 0006 | ... |
| 0007 | ... |
| ... | ... |

| SESSION ID | TERMINAL ID | GROUP NAME | SHARED FOLDER URI | ACCOUNT NAME | PASSWORD |
|---|---|---|---|---|---|
| 01 | 0001, 0002, 0003, 0004, 0005 | ALL | http://kaigi.com/share/01_ALL | acc1 | 11111111 |
|  | 0001, 0002 | A1 | http://kaigi.com/share/01_A1 | acc2 | 22222222 |
|  | 0003, 0004 | A2 | http://a-intra.com/share/01_A2 | acc3 | 33333333 |
| 02 | 0006, 0007 | ALL | http://kaigi.com/share/02_ALL | acc4 | 44444444 |
| ⋮ | ⋮ | ⋮ | ⋮ | ⋮ | ⋮ |

| SESSION ID | TERMINAL ID | GROUP NAME | SHARED FOLDER URI | ACCOUNT NAME | PASSWORD |
|---|---|---|---|---|---|
| 01 | 0001, 0002, 0003 | ALL | http://kaigi.com/share/01_ALL | acc1 | 11111111 |
| | 0001, 0002 | A1 | http://kaigi.com/share/01_A1 | acc2 | 22222222 |

70B

| SESSION ID | TERMINAL ID | GROUP NAME | SHARED FOLDER URI | ACCOUNT NAME | PASSWORD |
|---|---|---|---|---|---|
| 01 | 0001, 0002, 0003, 0004 | ALL | http://kaigi.com/share/01_ALL | acc1 | 11111111 |
| | 0001, 0002 | A1 | http://kaigi.com/share/01_A1 | acc2 | 22222222 |
| | 0003, 0004 | A2 | http://a-intra.com/share/01_A2 | acc3 | 33333333 |

FIG.13

| GROUP NAME | DELETE OR KEEP |
|---|---|
| A1 | DELETE |
| A2 | KEEP |
| A3 | KEEP |
| ... | ... |

| TERMINAL ID | CONNECTION TYPE | GROUP NAME |
|---|---|---|
| 0001 | INTERNET | A1 |
| 0002 | INTERNET | A1 |
| 0003 | INTRANET A | A2 |
| 0004 | INTRANET A | A2 |
| 0005 | INTERNET | Z2 |
| 0006 | INTERNET | Z2 |
| ... | ... | ... |

FIG.17

| INTRANET ID | INTRANET URI |
|---|---|
| INTRANET A | http://a-intra.com/ |
| INTRANET B | http://b-intra.co.jp/ |
| ... | ... |

FIG.22

| TERMINAL ID | FIRST ATTRIBUTE CONNECTION TYPE | SECOND ATTRIBUTE |
|---|---|---|
| USER 1 | FACILITY a | DIVISION A |
| USER 2 | FACILITY a | DIVISION A |
| USER 3 | FACILITY b | DIVISION A |
| USER 4 | FACILITY b | DIVISION B |
| USER 5 | FACILITY c | DIVISION A |
| USER 6 | FACILITY c | DIVISION B |
| ... | ... | ... |

COMMUNICATION SERVER, COMMUNICATION SYSTEM, PROGRAM, AND COMMUNICATION METHOD

TECHNICAL FIELD

The present invention relates to a communication server connected to a plurality of communication terminals participating in a conference and managing the communications among the communication terminals, a communication system, a program, and a communication method.

BACKGROUND ART

A conference system proving a remote conference via a communication network such as the Internet has been widely used for a long time. In the conference system, a terminal device for the remote conference system is used in a conference room where one of the participants of the remote conference is located, so that the terminal device collects data of conference room images and voice sounds of the participants, and converts the collected data into digital data and transmits the converted digital data to the other terminal devices for the remote conference system of the other participants. In the other terminal device, the video or the like are displayed on a display and the like and voice sounds are output via a speaker or the like. In the conference system in the related art, a conference can be conducted similar to an actual conference.

Further, there has been known a technique in which screen data of a computer are transmitted to a terminal device for a conference system of the other party to be displayed on a display in the conference room of the other party.

For example, Patent Document 1 describes that to share the documents of a conference, the display data of the documents of one party are transmitted to the other party, so that the other party can refer to the same documents as those of the one party.

SUMMARY OF THE INVENTION

Problems to be Solved by the Invention

However, in the technique described above, it is possible to show the screen on the computer of one party, but it is not possible to directly share the file that is being displayed to the other party. Therefore, for example, if a person who is presenting the screen to be displayed on the computers turns a page, the other participants cannot freely refer to the previous or next page.

Further, in the related technologies, it is possible to show the screen to the other party, but it is not possible to give the file to the other participants. Therefore, it become necessary to separately send the file via e-mail or the like before the conference begins or share the file using additional network storage. In these cases, for example, it is required to know the mail address of the other party or generate an account for the network storage. Therefore, workload is increased. Further, when data are shared using the Internet, it is necessary to consider a security issue. Therefore, more time is required for the preparation.

The present invention is made in light of the above problems, and an object of the present invention is to provide a communication server able to securely share data with the other party, the communication system, a program, and a communication method.

Means for Solving the Problems

To achieve the above object, the present invention employs the following configurations.

According to an aspect of the present invention, a communication server that is connected with a plurality of communication terminals transmits and receives content data and manages communications between the plurality of communication terminals. The communication server includes a terminal management unit managing data identifying each of the plurality of communication terminals in association with group identification data identifying a group to which each of the plurality of communication terminals belongs to; a determination unit determining, when a session for transmitting and receiving content data is established between first and second communication terminals included in the plurality of communication terminals, whether the group identification information of the first and second communication terminals associated with the session are a same as each other based on the group identification data; and a report unit reporting, when the determination unit determining that the group identification information of the first and second communication terminals are the same as each other, shared location information indicating a location of a shared memory area shared between the first and second communication terminals to the first and second communication terminals associated with the session while the session is being established.

Effects of the Present Invention

According to an aspect of the present invention, it may become possible to securely share data with another party.

BRIEF DESCRIPTION OF THE DRAWINGS

FIG. 6 is an example of a terminal management table according to the first embodiment;

FIG. 7 is an example of a shared folder table according to the first embodiment;

FIG. 12 is a drawing illustrating an update of the shared folder table according to the first embodiment;

FIG. 13 is an example of a table indicating whether a group shared folder is to be deleted;

FIG. 16 is an example of the terminal management table according to the second embodiment;

FIG. 17 is an example of a network management table according to the second embodiment;

FIG. 22 is an example of the terminal management table according to the third embodiment.

BEST MODE FOR CARRYING OUT THE INVENTION

According to an embodiment of the present invention, it may become possible to securely share data with other terminals participating in an electronic conference by reporting to a terminal the location of the folders determined for each group that is shared only by the terminals belonging to the same group.

First Embodiment

Figure 1:
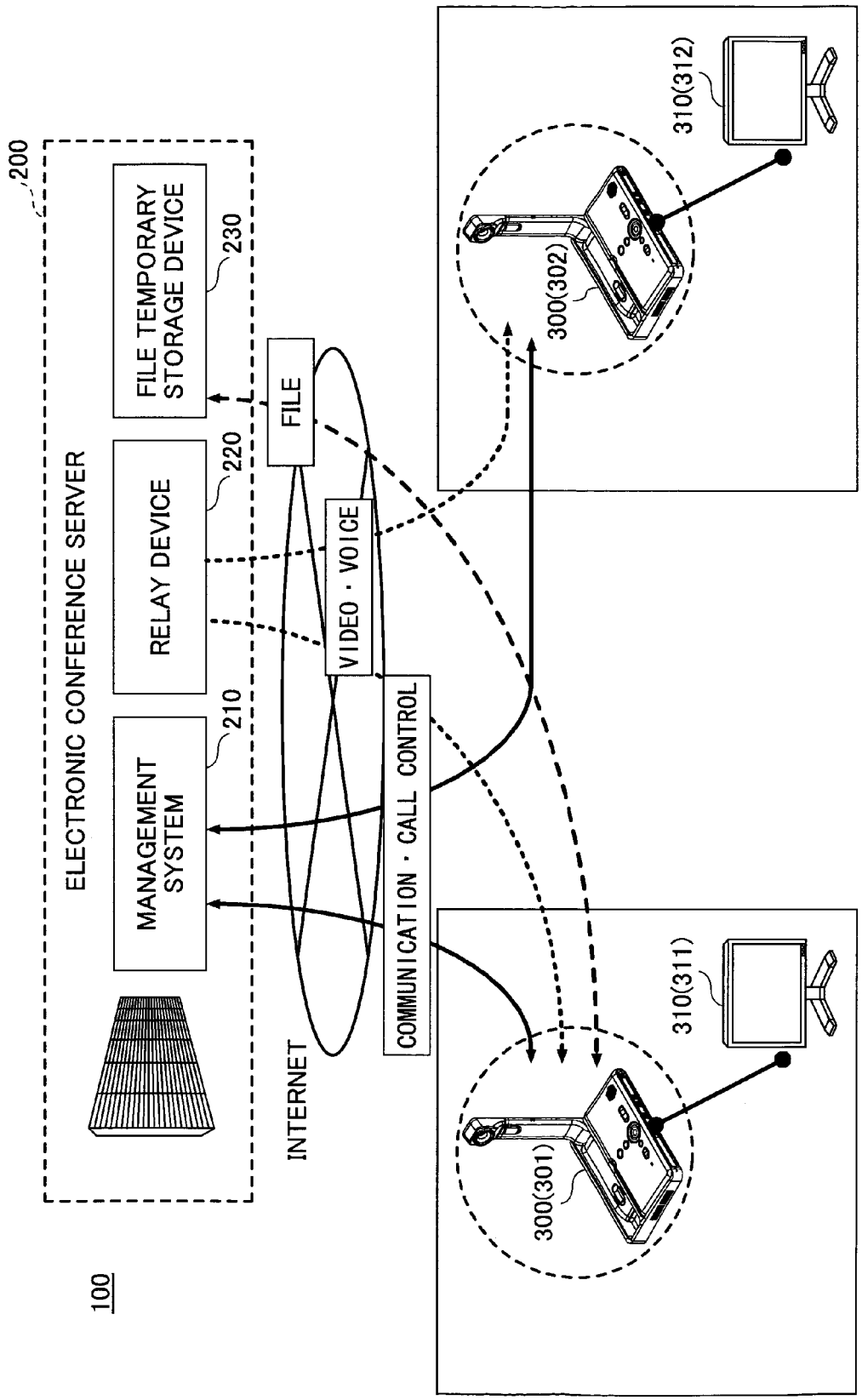
FIG. 1 is a drawing illustrating a configuration of an electronic conference system according to a first embodiment.

A first embodiment of the present invention is described with reference the accompanying drawings. FIG. 1 illustrates a configuration of an electronic conference system according to a first embodiment.

An electronic conference system 100 according to this embodiment includes an electronic conference server 200 and two or more pairs, each of the pairs including an electronic conference terminal 300 and a personal computer (PC) 310. Further, the electronic conference system 100 according to this embodiment is one of communication systems.

The electronic conference server 200 according to this embodiment is one of the communication servers, and the electronic conference terminal 300 is one of the communication terminals. Further, in the descriptions below, when two or more pairs of the electronic conference terminal 300 and personal computer (PC) 310 are to be separately recognized, the electronic conference terminal 300 may be referred to as, for example, the electronic conference terminals 301, 302, . . . , and the personal computer (PC) 310 may be referred to as the PCs 311, 312, . . . , . On the other hand, when it is not necessary to separately describe the pairs, the electronic conference terminal(s) 300 and the PC(s) 310 are used.

The electronic conference server 200 includes a transmission management system ("management system") 210, a relay device 220, and a file temporary storage device 230. The management system 210 provides a service of managing the communications between the electronic conference terminals 300 participating the conference. To that end, for example, the management system 210 generates a session ID to identify the session for communicating content data such as images, voice sound and the like between the electronic conference terminals 300. When generating the session ID, the management system 210 associates the electronic conference terminals 300 with each other that participate in the session corresponding to the session ID. Due to the association, it becomes possible to identify the electronic conference terminals 300 who are sharing the same file based on the session ID in the electronic conference system 100. Here, the "content data" refers to the data including at least one of, for example, video data, image data, voice data, and text data.

The relay device 220 provides a service of relaying video and voice data based on a selected route so that the video and voice data are transmitted through the optimal route. To that end, for example, the relay device 220 monitors the delay time and the like to optimize the relay route and the resolutions of the content data. The file temporary storage device 230 provides a service of sharing a file among the electronic conference terminals 300 that are participating the conference.

Further, as the electronic conference server 200, it is assumed that the management system 210, the relay device 220, and the file temporary storage device 230 are contained in the same information processing apparatus, and the information processing apparatus is called the electronic conference server 200. However, the present invention is not limited to this configuration. Namely, it is not always necessary that the management system 210, the relay device 220, and the file temporary storage device 230 are contained within a single information processing apparatus, and may be separately mounted (included) in different information processing apparatuses. In other words, the electronic conference server 200 includes one or more information processing apparatuses. Further, for example, the electronic conference server 200 may includes one or more information processing apparatuses and the relay device 220 may be provided as a separate configuration.

Figure 2:
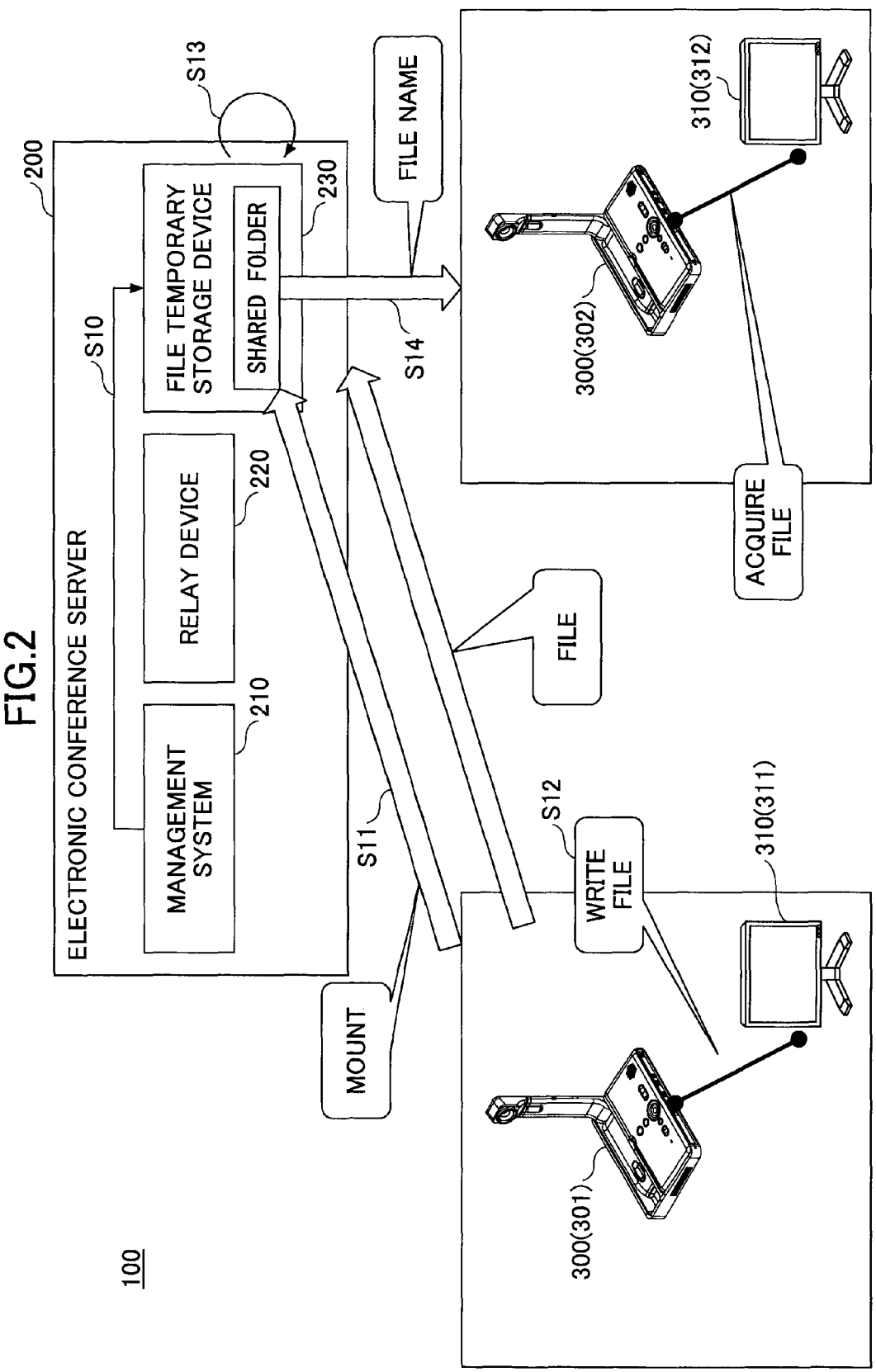
FIG. 2 is a schematic drawing illustrating an operation in the electronic conference system according to the first embodiment.

In the following, with reference to FIG. 2, an operation of sharing a file of the PC 311 between the electronic conference terminals 302 and 301 is described. FIG. 2 schematically illustrates an operation in the electronic conference system according to the first embodiment.

In the electronic conference system 100 in this embodiment, when a conference (meeting) starts, the management system 210 causes the file temporary storage device 230 to generate a shared folder. The file temporary storage device 230 generates the shared folder to be shared by the electronic conference terminals 300 that will participate in the conference, and reports a shared folder URI (Uniform Resource Identifier) and account data (described below) to the electronic conference terminals 301 and 302 (step S10).

Next, the electronic conference terminals 301 and 302 use the account data to mount a folder on the shared folder URI (step S11). In this embodiment, the term "mount" refers to an operation to enable the shared folder of the file temporary storage device 230 to be used by the electronic conference terminals 301 and 302 so that the electronic conference terminals 301 and 302 can use the shared folder similar to the files thereof.

In the electronic conference system 100 in this embodiment, for example, when the PC 311 writes a file in the electronic conference terminal 301, the electronic conference terminal 301 detects that the file is written and transmits the file to the file temporary storage device 230 (step S12). In this case, the file is not left in the electronic conference terminal 301.

Next, the file temporary storage device 230 stores the file in the shared folder (step S13). Then, the file temporary storage device 230 reports the file name of the file stored in the shared folder to the electronic conference terminal 302 that mounts the shared folder (step S14). In this embodiment, the substance (contents) of the file will not be transmitted to the electronic conference terminal 302 without any explicit request. A user of the PC 312 may check the file name of the file and send a request to the file temporary storage device 230 so as to view the contents of the file when necessary. Further, in this embodiment, based on the user's operation, the PC 312 may acquire the contents of the file from the shared folder via the electronic conference terminal 302 and display the contents of the file on the display or the like.

As described above, in the electronic conference system 100 according to this embodiment, based on a simple operation where the PC 312 writes a file in the electronic conference terminal 301, the electronic conference terminals 301 and 302 may share the same file.

Further, in the electronic conference system 100 according to this embodiment, it is a service other than the relay device 220 transmitting content data that shares the file. Therefore, the electronic conference terminals 300 may share the file without being influenced by the transmission and receiving of the content data. Further, the file temporary storage device 230 manages the file in association with the session ID. Therefore, in this embodiment, the file temporary storage device 230 that is a service other than the management system 210 manages the sharing of files.

Figure 3:
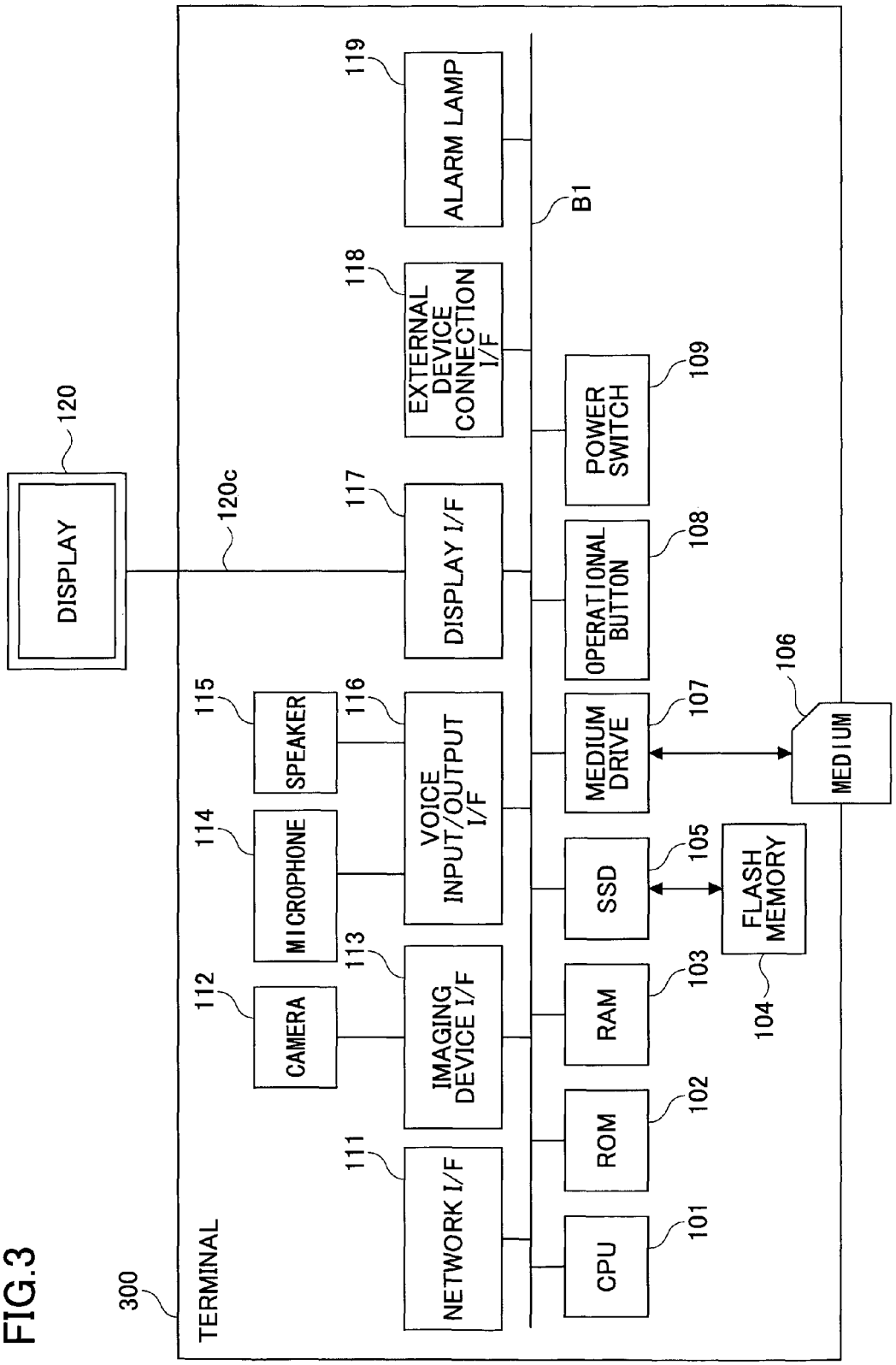
FIG. 3 is a drawing illustrating a hardware configuration of an electronic conference terminal according to an embodiment.

Next, the electronic conference terminal 300 according to this embodiment is described with reference to FIG. 3. FIG. 3 illustrates a hardware configuration of the electronic conference terminal 300 according to this embodiment.

As shown in FIG. 3, the electronic conference terminal 300 includes a Central Processing Unit (CPU) 101 that controls the operations of the entire electronic conference terminal 300, a Read Only Memory (ROM) 102 storing programs for the terminal, a Random Access Memory (RAM) 103 that is used as a working area of the CPU 101, a flash memory 104 storing various data such as image data, voice data and the like, a Solid State Drive (SSD) 105 that control reading and writing various data to and from the flash memory 104 based on the control of the CPU 101, a medium drive 107 that controls the writing and reading data to and from a recording medium 106 such as a flash memory, an operational button 108 that is operated to, for example, select the destination of the electronic conference terminal 300, a power switch 109 to turn on/off the power of the electronic conference terminal 300, and a network interface (I/F) 111 for data transmission using a communication network.

Further, the electronic conference terminal 300 further includes a built-in type camera 112 to acquire image data by imaging an object based on the control of the CPU 101, an imaging device I/F 113 that controls the drive of the camera 112, a built-in type microphone 114 to input voice sound, a speaker 115 to output voice sound, and a voice input/output interface 116 that performs processes for inputting and outputting a voice signal from and to the microphone 114 and the speaker 115, a display I/F 117 that transmits image data to an external display 120 based on the control of the CPU 101, an external device connection I/F 118 for connecting various external devices, an alarm lamp 119 to report an abnormal state of various functions of the electronic conference terminal 300, and an address line and a bus line B1 to electronically connect the above elements with each other as shown in FIG. 3.

Further, in this embodiment, it is assumed that the camera 112 and the microphone 114 are built-in types. However, the present invention is not limited to this configuration. Namely, for example, the electronic conference terminal 300 in this embodiment may not have the camera 112 and the microphone 114, and the camera 112 and the microphone 114 may be externally provided.

Further, the electronic conference terminal 300 according to this embodiment may be realized by, for example, a general-purpose computer or the like, as it is not always necessarily a terminal dedicated to an electronic conference. For example, the electronic conference terminal 300 according to this embodiment may be a tablet-type terminal device, a multifunctional cellular phone such as a smart phone or the like.

The display 120 is a display part that displays an image of an object and icons for operations and may be a liquid crystal or an organic EL display. Further, the display 120 is connected to the display I/F 117 via a cable 120c. This cable 120c may a cable for analog RGB, a cable for component video, or a cable for a High-Definition Multimedia Interface (HDMI) (Registered Trademark) or a Digital Video Interactive (DVI) signal.

The camera 112 includes a lens and a solid-state image sensing device that converts light into electrons to digitalize the image (video picture) of an object. As the solid-state image sensing device, a Complementary Metal Oxide Semiconductor (CMOS), a Charged Coupled Device (CCD) or the like may be used.

The external device connection I/F 118 is electronically connectable with an external device such as an external camera, an external microphone, an external speaker and the like via a Universal Serial Bus (USB) cable or the like connected to a connector (not shown) formed on the chassis of the electronic conference terminal 300. When an external camera is connected, not the built-in type camera 112 but the external camera is preferentially operated under the control of the CPU 101. Similarly, when an external microphone or speaker is connected, not the microphone 114 or the speaker 115 but the external microphone or speaker, respectively, is preferentially used under the control of the CPU 101.

The recording medium 106 is detachably connected to the electronic conference terminal 300. As the recording medium 106, there is a non-volatile memory that can be written to and read from under the control of the CPU 101. As such a non-volatile memory, not only the flash memory 104 but also an Electrically Erasable and Programmable ROM (EEPROM) or the like may be used.

Further, the above program for the electronic conference terminal 300 may be a file in an installable or an executable format and stored in a computer-readable recording medium (recording medium 106 or the like) so as to be provided (distributed). Further, the above program may not be stored in the flash memory 104 but may be stored in the ROM 102.

Figure 4:
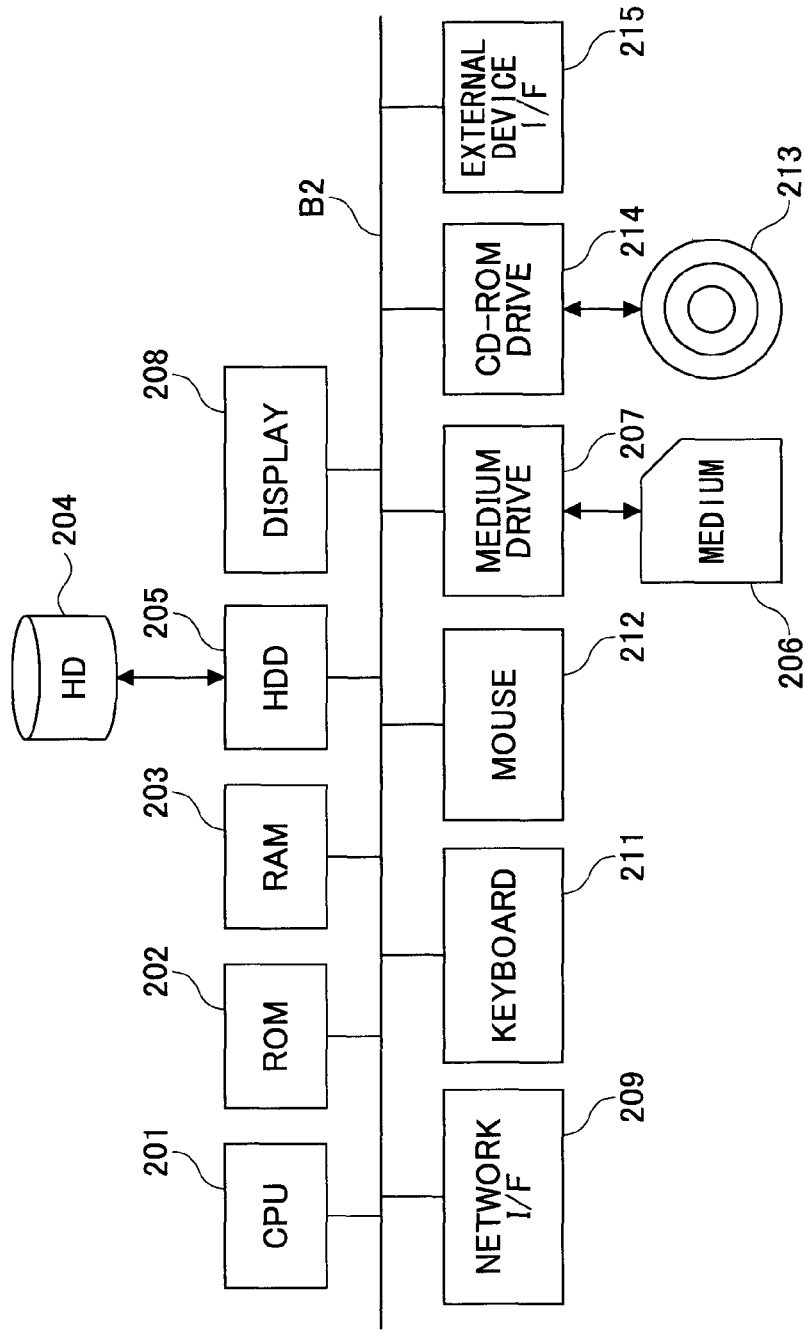
FIG. 4 is a drawing illustrating a hardware configuration of a management system according to an embodiment.

Next, the management system 210 according to this embodiment is described with reference to FIG. 4. FIG. 4 illustrates a hardware configuration of the management system 210 according to, this embodiment.

As shown in FIG. 4, the management system 210 includes a CPU 201 that controls the operations of the entire management system 210, a ROM 202 that stores a program, a RAM 203 that is used as a working area of the CPU 201, a Hard Disk (HD) 204 that stores various data, a Hard Disk Drive (HDD) 205 that controls writing and reading various data in and from the HD 204 under the control of the CPU 201, a media drive 207 that controls writing (storing) and reading data to and from the recording medium 206 such as a flash memory, a display that displays various data such as a cursor, a menu, a window, characters, images and the like, a network I/F 209 for transmitting data via a communication network, a keyboard 211 including a plurality of keys for inputting characters, figures, various instructions and the like, a mouse 212 that is used to select and execute various instructions, select processing targets, move a cursor and the like, a Compact Disc Read Only Memory (CD-ROM) drive 214 that controls writing and reading data to and from a CD-ROM 213 that is an example of the detachable recording medium, an external device I/F 215 for connecting to an external device, and an address line and a bus line B2 to electronically connect the above elements with each other as shown in FIG. 4.

Further, the above program may be a file in an installable or an executable format and stored in a computer-readable recording medium such as the recording medium 206, the CD-ROM 213 or the like so as to be provided (distributed).

Further, the relay device 220 according to this embodiment has a hardware configuration similar to that of the management system 210. Therefore, the description thereof is herein omitted. However, a relay-device program for controlling the relay device 220 is stored in the ROM 202. In this case as well, the relay-device program may be a file in an installable or an executable format and stored in a computer-readable recording medium such as the recording medium 206, the CD-ROM 213 or the like so as to be provided (distributed).

In this embodiment, when the electronic conference terminals 300 are divided into a plurality of groups, for groups of the electronic conference terminals 300, the corresponding files may be shared. Specifically, in this embodiment, the electronic conference terminals 300 belonging to the same group are associated with the shared folder to be shared by the electronic conference terminals 300 belonging to the same group.

Figure 5:
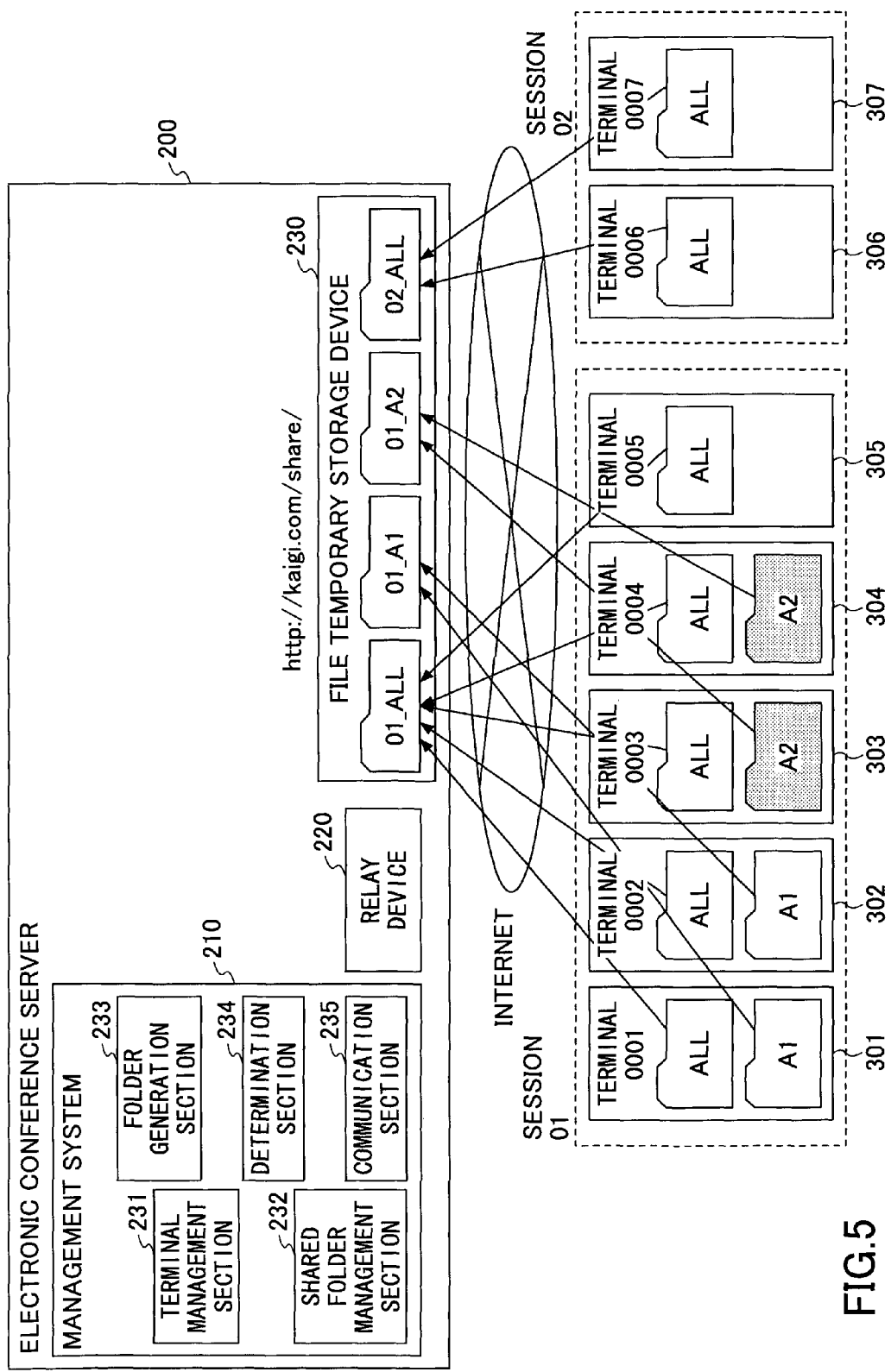
FIG. 5 is a drawing illustrating the corresponding relationships between electronic conference terminals and shared folders according to the first embodiment.

Next, with reference to FIG. 5, the corresponding relationships between the electronic conference terminals 300 in the same group and the shared folders are described. FIG. 5 illustrates the corresponding relationships between the electronic conference terminals 300 and the shared folders according to the first embodiment.

In FIG. 5, a case is described where the electronic conference terminals 301 through 305 participate in a conference whose session ID (conference ID) is 01 and the electronic conference terminals 306 and 307 participate in another conference whose session ID is 02.

In this case, the electronic conference server 200 causes the management system 210 to generate a shared folder 01_ALL to be shared by all the electronic conference terminals 301 through 305 who participate in the conference of the session ID01 in the file temporary storage device 230. Further, the electronic conference server 200 causes the management system 210 to generate a shared folder 02_ALL to be shared by all the electronic conference terminals 306 and 307 who participate in the conference of the session ID02 in the file temporary storage device 230.

Further, in this embodiment, two groups are formed in the electronic conference terminals 301 through 305. In the example of FIG. 5, the electronic conference terminals 301 and 302 belong to a group A1, and the electronic conference terminals 303 and 304 belong to a group A2.

In the electronic conference server 200 according to this embodiment, the management system 210 causes the file temporary storage device 230 to generate the shared folders corresponding to the groups.

Specifically, for example, the electronic conference server 200 according to this embodiment generates the shared folder 01-A1 to be shared by only the electronic conference terminals 301 and 302 belonging to the group A1. Further, similarly, the electronic conference server 200 according to this embodiment generates the shared folder 01-A2 to be shared by only the electronic conference terminals 303 and 304 belonging to the group A2.

In this embodiment, when the electronic conference terminals 300 participating the same session (conference) are divided into a plurality of groups, a shared folder to be shared by only the electronic conference terminals 300 belonging to the same group is generated for each group.

In this embodiment, by doing this, while security is maintained, a necessary file may be shared between the electronic conference terminals 300 participating the same session. Therefore, the shared files may be finely managed.

Further, in this embodiment, the electronic conference terminals 300 may be divided into a plurality of groups based on, for example, the identifiers of the electronic conference terminals 300 that are set in advance or other data having been set to the electronic conference terminals 300.

Further, in this embodiment, the shared folder generated in the file temporary storage device 230 refers to a storage area shared by the electronic conference terminals 300 belonging to the same group. In this embodiment, the storage area is called the shared folder. However, the name of the storage area is not limited to the shared folder. The storage area shared by the electronic conference terminals 300 belonging to the same group may be called a directory or the like. Also, a file may be simply stored in the storage area.

In the following, the generation and correspondence of the shared folder by the management system 210 according to this embodiment for each group are described. In the following descriptions, the shared file for each group may be called a "group shared folder".

The management system 210 according to this embodiment includes a terminal management table for managing the electronic conference terminals 300 and a shared folder table including data of the shared folder associated with the electronic conference terminals 300.

In the following, the functions of the management system 210 according to this embodiment are described. The management system 210 according to this embodiment includes a terminal management section 231, a shared folder management section 232, a folder generation section 233, a determination section 234, and a communication section 235. For example, the functions of those sections in the management system 210 according to this embodiment are realized when the CPU 201 reads the program stored in the ROM 202 and executes the program.

The terminal management section 231 generates the terminal management table that manages the terminal IDs, identifying the respective electronic conference terminals 300, in association with the group name when the electronic conference terminals 300 participating the same session (conference) are divided in a plurality of groups.

The shared folder management section 232 generates the shared folder for each group in the file temporary storage device 230, and manages the folders including the removal of the shared folder and the like. Further, the shared folder management section 232 according to this embodiment associates the generated shared folder with the groups.

Specifically, when connections are established among a plurality of the electronic conference terminals 300 participating the conference, the shared folder management section 232 generates the session ID (identification data) corresponding to the conference. Then, the shared folder management section 232 generates the shared folder table in which the session ID is associated with the data including the terminal IDs and the data identifying the group name and the shared folder. Details of the terminal management table and the shared folder table are described.

The folder generation section 233 generates the shared folder for each group in the file temporary storage device 230.

The determination section 234 refers to the shared folder table and determines whether the group name corresponding to the electronic conference terminals 300 participating the same session are the same as each other.

The communication section 235 reports the location of the shared folder to each of the electronic conference terminals 300.

FIG. 6 illustrates an example of the terminal management table according to the first embodiment. As shown in FIG. 6, a terminal management table 60 manages the terminal IDs identifying the electronic conference terminals 300 in association with the group names to which the electronic conference terminals 300 belong. The terminal management table 60 may be previously stored in, for example the ROM 202 or the RAM 203 which are the storage area of the management system 210.

Further, in the terminal management table 60, it is assumed that the group name of the group to which the electronic conference terminal 300 belongs is associated with the terminal ID. However, the present invention is not limited to this configuration. For example, as the data to be associated with the terminal ID, any data that may identify the group to which the electronic conference terminal 300 belongs may be used. Namely, the group identification data that identifies the group to which the electronic conference terminal 300 belongs are given to each of the electronic conference terminals 300 when the electronic conference terminals 300 are divided into a plurality of groups. The group name according to this embodiment corresponds to the group identification data.

FIG. 7 illustrates an example of the shared folder table according to the first embodiment. In a shared folder table 70, the session ID, the terminal ID, the group name, the shared folder URI, the account name, and the password are associated with each other.

For example, the session ID may be automatically given by the management system 210 whenever a conference is held. The terminal ID and the group name are described with reference to FIG. 6. The shared folder URI refers to the data identifying the shared folder generated by the file temporary storage device 230. In this embodiment, the shared folder URI refers to the Uniform Resource Locator (URL) indicating the location of the shared folder.

The account name and the password refer to the account data that are reported along with the shared folder URI to the electronic conference terminals 300 that share the shared folder. For example, the account data may be previously set when the shared folder is generated. Further, the shared folder URI and the account data are values that are invisible for a user and mechanically treated. Therefore, an obfuscated character string such as a hash value may be used.

Further, in this embodiment, for example, the terminal management table 60 may be generated based on the data which are read from the data in the electronic conference terminal 300 by the terminal management section 231 of the management system 210 when the management system 210 is connected to the electronic conference terminal, 300. Further, the terminal management table 60 may be stored in the management system 210 in advance.

The management system 210 in this embodiment associates the electronic conference terminals 300 with the group shared folders by using the terminal management table 60 and the shared folder table 70.

Figure 8:
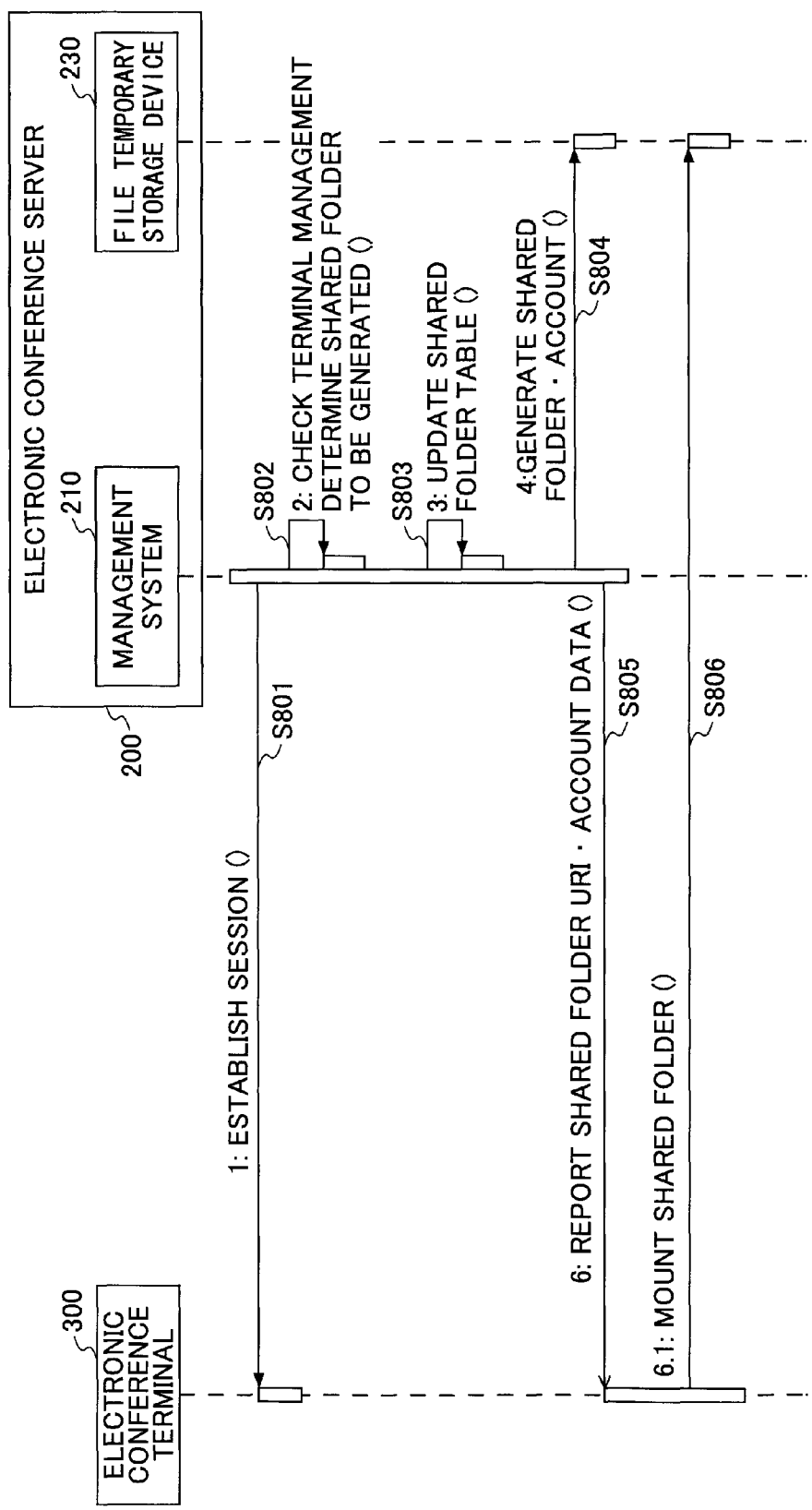
FIG. 8 is a sequence diagram illustrating an operation of an electronic conference server according to the first embodiment.

In the following, data transactions between the electronic conference server 200 and the electronic conference terminals 300 in the electronic conference system 100 according to this embodiment are described with reference to FIG. 8. FIG. 8 is a sequence diagram illustrating the operations of the electronic conference server 200 according to the first embodiment.

When the conference in the electronic conference system 100 according to this embodiment starts, the management system 210 of the electronic conference server 200 establishes a session for transmitting and receiving content data with the electronic conference terminals 300 that are to participate in the conference (step S801). Next, the management system 210 causes the shared folder management section 232 to refer to the terminal management table 60 and determines the group shared folder to be generated (step S802). Details of the process in step S802 are described below.

When the group shared folder to be generated in step S802 is determined, the shared folder management section 232 updates the shared folder table 70 (step S803). Next, the management system 210 causes the folder generation section 233 to generate the account of the group shared folder and the group shared, folder in the file temporary storage device 230 (step S804). Further, in this embodiment, in step S804, besides the group shared folder, the folder generation section 233 may further generate a shared folder that is to be shared by all the electronic conference terminals 300 that participate in the same conference in the file temporary storage device 230.

Next, the management system 210 causes the communication section 235 to refer to the shared folder table 70 and report the shared folder URI of the shared folder and the shared folder URI of the group shared folder, and account data to access the shared folder to the electronic conference terminals 300 (step S805). Next, the electronic conference terminal 300 mounts the shared folder and the group shared folder on the file temporary storage device 230 (step S806). The mounting of the shared folder is described below. Further, in this embodiment, it is assumed that the shared folder to be shared by all the electronic conference terminals 300 that participate in the same conference is generated besides the group shared folder. However, the present invention is not limited to this configuration. Namely, for example, in this embodiment, only the group shared folder may be generated.

In this embodiment, it is described that after the shared folder table 70 is updated in step S803, the corresponding shared folder is generated in step S804. However, this order of steps S803 and S804 may be inverted. For example, in this embodiment, after the shared folder and the group shared folder are generated in the file temporary storage device 230, the shared folder table 70 may be updated.

Figure 9:
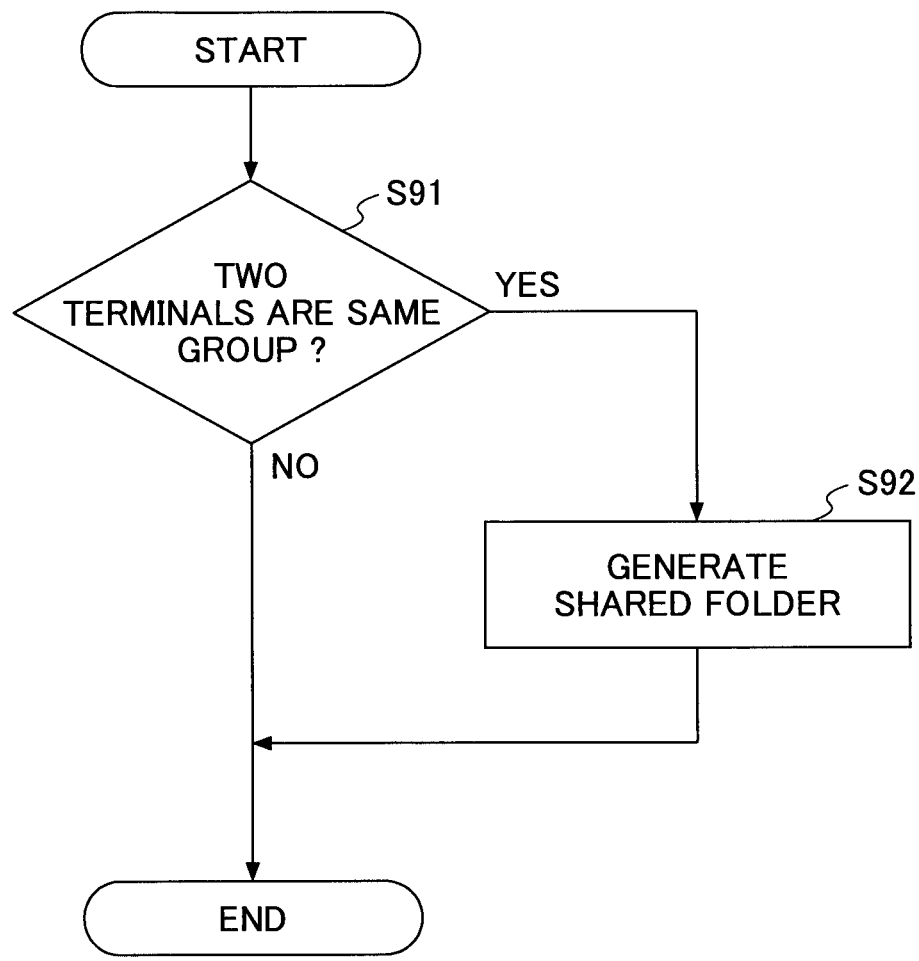
FIG. 9 is a flowchart illustrating a process of determining the shared folder to be generated in the first embodiment.

In the following, the process in step S802 is described with reference to FIG. 9. FIG. 9 is a flowchart illustrating a process of determining the shared folder to be generated in the first embodiment.

In this embodiment, when the conference starts, the connections are established so that plurality of electronic conference terminals 300 can transmit and receive data to and from the electronic conference server 200. The management system 210 according to this embodiment causes the determination section 234 to refer to the terminal management table 60 and determine whether there are electronic conference terminals 300 that belong to the same group among the electronic conference terminals 300 participating the same conference (step S91). When determining that there are electronic conference terminals 300 belonging to the same group in step S91, the folder generation section 233 generates the group shared folder in the file temporary storage device 230 (step S92). When determining that there are no electronic conference terminals 300 that belong to the same group in step S91, no group shared folder is generated and the process ends.

In the following, the process in FIG. 9 is specifically described with reference to FIGS. 5 and 6. For example, a case is described where the electronic conference server 200 and the electronic conference terminal 302 are connected to participate in the conference that is identified by the session ID01 in this embodiment. Further, in this case, it is assumed that the session that is necessary for transmitting and receiving the content data between the electronic conference terminal 301 and the electronic conference terminal 302 has already been established by the electronic conference server 200.

In this case, the management system 210 refers to the terminal management table 60 and acquires the group name corresponding to the terminal ID0002 of the electronic conference terminal 302. The group name is group A1. Next, the management system 210 determines whether there is a terminal 300 that belongs to the group A1 among the electronic conference terminals 300 participating in the session ID01. Here, the electronic conference terminal 301 belongs to the group A1.

Therefore, the management system 210 generates the group shared folder to be shared by the electronic conference terminals 300 belonging to the group A1 in the file temporary storage device 230. Then, the management system 210 reports the shared folder URI of the generated group shared folder and the account data thereof to the electronic conference terminals 301 and 302 that belong to the group A1.

Figure 10:
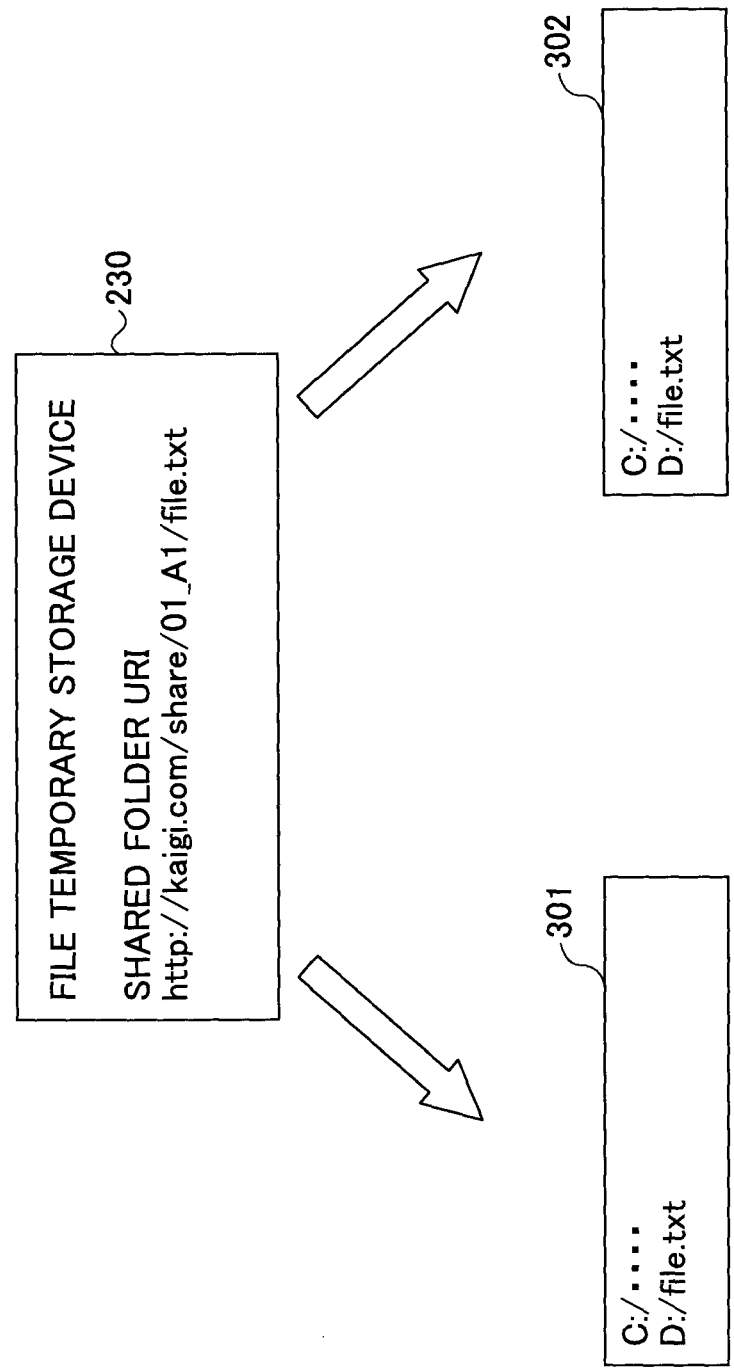
FIG. 10 is a schematic drawing illustrating mounting of the shared folder according to the first embodiment.

Next, the mounting of the shared folder is described with reference to FIG. 10. FIG. 10 schematically illustrates the mounting of the shared folder according to the first embodiment.

In this embodiment, it is assumed that the shared folder URI of the file temporary storage device 230 is "http://kaigi.com/share/01_A1". The electronic conference terminals 301 and 302 have mounted the group shared folder by designating this URI. Therefore, the group shared folder is mounted on the electronic conference terminals 301 and 302. For example, when the electronic conference terminals 301 and 302 designate D drive as the mounting destination, the group shared folder is mounted as the D drive.

In this case, when, for example, a file "file.txt" is stored in the group shared folder in the file temporary storage device 230, the file name "file.txt" is displayed in the D drive of the electronic conference terminals 301 and 302. In this case, the main body of the file is in the group shared folder in the file temporary storage device 230.

Next, a case is described where an electronic conference terminal 300 participates in the conference during (in the middle of) the conference in the electronic conference system 100 according to this embodiment. In this case where an electronic conference terminal 300 participates in the conference during the conference, the process differs from that in step S802 of FIG. 8. Further, when it is not necessary to generate the group shared folder, the management system 210 performs only updating the shared folder table 70 by the shared folder management section 232.

Figure 11:
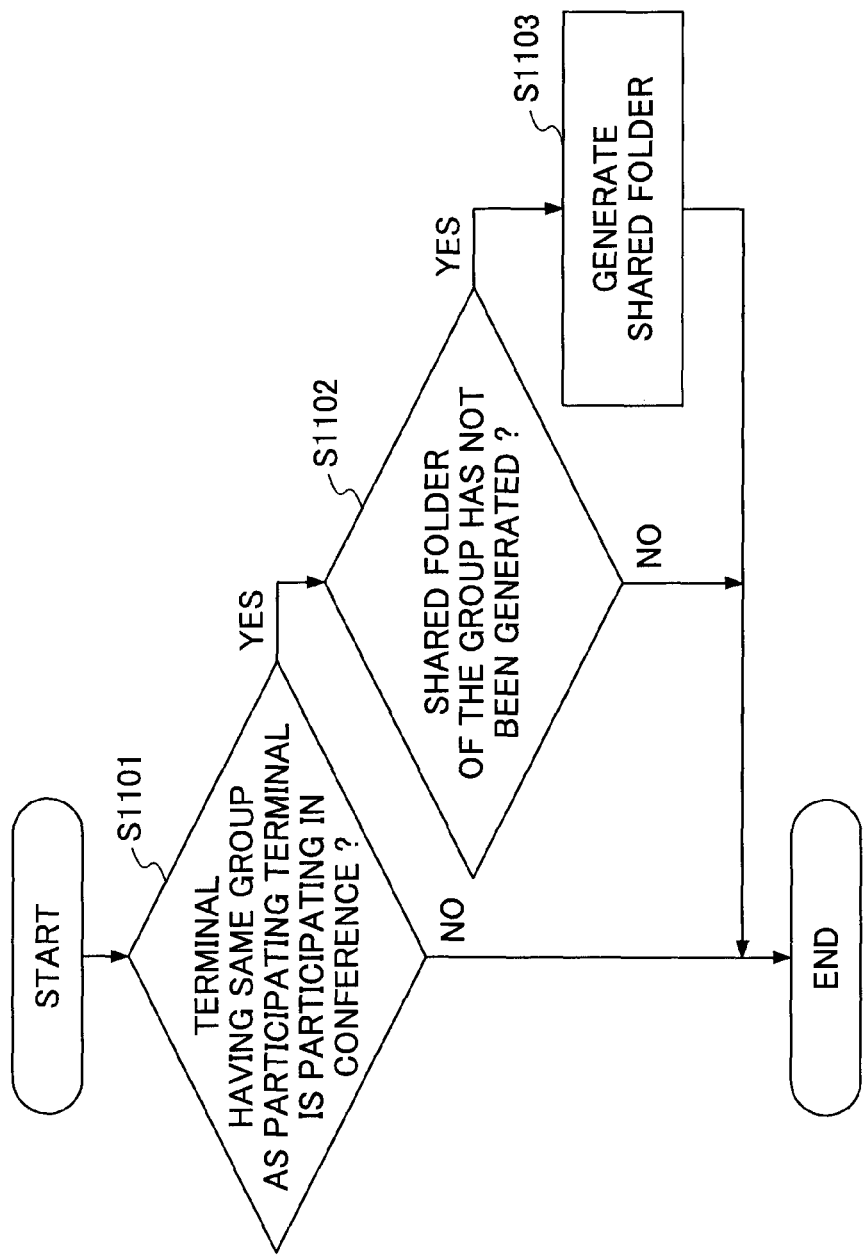
FIG. 11 is a flowchart illustrating a process of determining the shared folder to be generated when an electronic conference terminal participates during a conference according to the first embodiment.

In the following, the process is described when an electronic conference terminal 300 participates in the conference during the conference. FIG. 11 is a flowchart illustrating a process of determining the shared folder to be generated when an electronic conference terminal participates in a conference during the conference according to the first embodiment.

In the electronic conference system 100 according to this embodiment, when a session is established between the electronic conference terminals 300 that have already participated in a conference and the electronic conference terminal 300 that is to participate in the conference during the conference, the management system 210 of the electronic conference server 200 causes the determination section 234 to determine whether any of the electronic conference terminals 300, that belong to the same group as that of the electronic conference terminal 300 that is to participate in the conference during the conference, is participating in the conference (step S1101). Specifically, the management system 210 causes the determination section 234 to refer to the terminal management table 60 and the shared folder table 70 and determine whether there is an electronic conference terminal 300 belonging to the same group as that of the electronic conference terminal 300 that is to participate in the conference during the conference.

In step S1101, when it is determined that there is no electronic conference terminal 300 belonging to the same group as that of the electronic conference terminal 300 that is to participate in the conference during the conference, the management system 210 stops this process. On the other hand, when it is determined that there is an electronic conference terminals 300 belonging to the same group as that of the electronic conference terminal 300 that is to participate in the conference during the conference in step S1101, the management system 210 further determines whether a group shared folder has been generated in the file temporary storage device 230, the group shared folder corresponding to the group of the electronic conference terminal 300 that is to participate in the conference during the conference (step S1102).

In step S1102, when it is determined that the corresponding group shared folder exists in the file temporary storage device 230, the management system 210 stops this process. On the other hand, in steps S1102, when it is determined that there is no corresponding group shared folder in the file temporary storage device 230, the management system 210 causes the folder generation section 233 to generate the corresponding group shared folder (step S1103).

Next, the update of the shared folder table 70 when the electronic conference terminal 300 is to participate in the conference during the conference is descried with reference to FIG. 12. FIG. 12 illustrates an update of the shared folder table 70 according to the first embodiment.

In the example of FIG. 12, a case is described where the electronic conference terminal 304 participates in the conference during the conference in which the electronic conference terminals 301 through 303 participate already. The session ID of the conference is session ID01.

In FIG. 12, the shared folder table 70A is based on before the update, and the shared folder table 70B is based on after the update.

In the shared folder table 70A of FIG. 12, only the electronic conference terminals 301 and 302 among the electronic conference terminals participating in the conference of session ID01 belong to group A1. Therefore, in the file temporary storage device 230, there are generated the shared folder that is shared by all the electronic conference terminals 300 participating in the conference of session ID01 and the group shared folder corresponding to the group A1.

Then, when the electronic conference terminal 304 participates in the conference during the conference, the management system 210 refers to the terminal management table 60 to identify the group to which the electronic conference terminal 304 belongs. Here, the electronic conference terminal 304 belongs to group A2.

Therefore, the management system 210 determines whether there is any terminal that belongs to the group A2 from among the electronic conference terminals 301 through 303. In the example of FIG. 12, the electronic conference terminal 303 belongs to the group A2. Therefore, the management system 210 generates the group shared folder that corresponds to the group A2, and updates the shared folder table from the shared folder table 70A to the shared folder table 70B.

In this embodiment as described above, even when a new electronic conference terminal 300 participates the conference during the conference, it is possible to finely control (manage) the sharing of data including the new electronic conference terminal 300.

Further, in this embodiment, the shared folder and the group shared folder generated in the file temporary storage device 230 may be deleted after the conference is finished or kept (without being changed) in the file temporary storage device 230.

FIG. 13 is an example of a table indicating whether the group shared folder is to be deleted.

In the management system 210 in this embodiment, a table 80 as indicated in FIG. 13 may be stored in the ROM 202, the RAM 203 or the like. In this embodiment, for example, it is assumed that the group shared folders corresponding to the group A1 and the group A2 have been generated in the file temporary storage device 230 when the conference of session ID01 ends. In this case, the management system 210 causes the shared folder management section 232 to refer to the table 80, and delete the group shared folder corresponding to the group A1 and keep (store) the group shared folder corresponding to the group A2 as it is. Deleting the shared folder means that the memory area assigned to the shared folder in the file temporary storage device 230 is returned to the ordinary memory area.

Second Embodiment

Next, a second embodiment of the present invention is described with reference to the accompanying drawings. The second embodiment of the present invention differs from the first embodiment in that the group shared folder is generated in an apparatus other than the electronic conference server 200. Therefore, in the following description according to the second embodiment of the present invention, only the configurations different from those in the first embodiment are described. Further, the same reference numerals are used to describe the elements having the same functions as those of the elements in the first embodiment and repeated descriptions thereof may be omitted.

Figure 14:
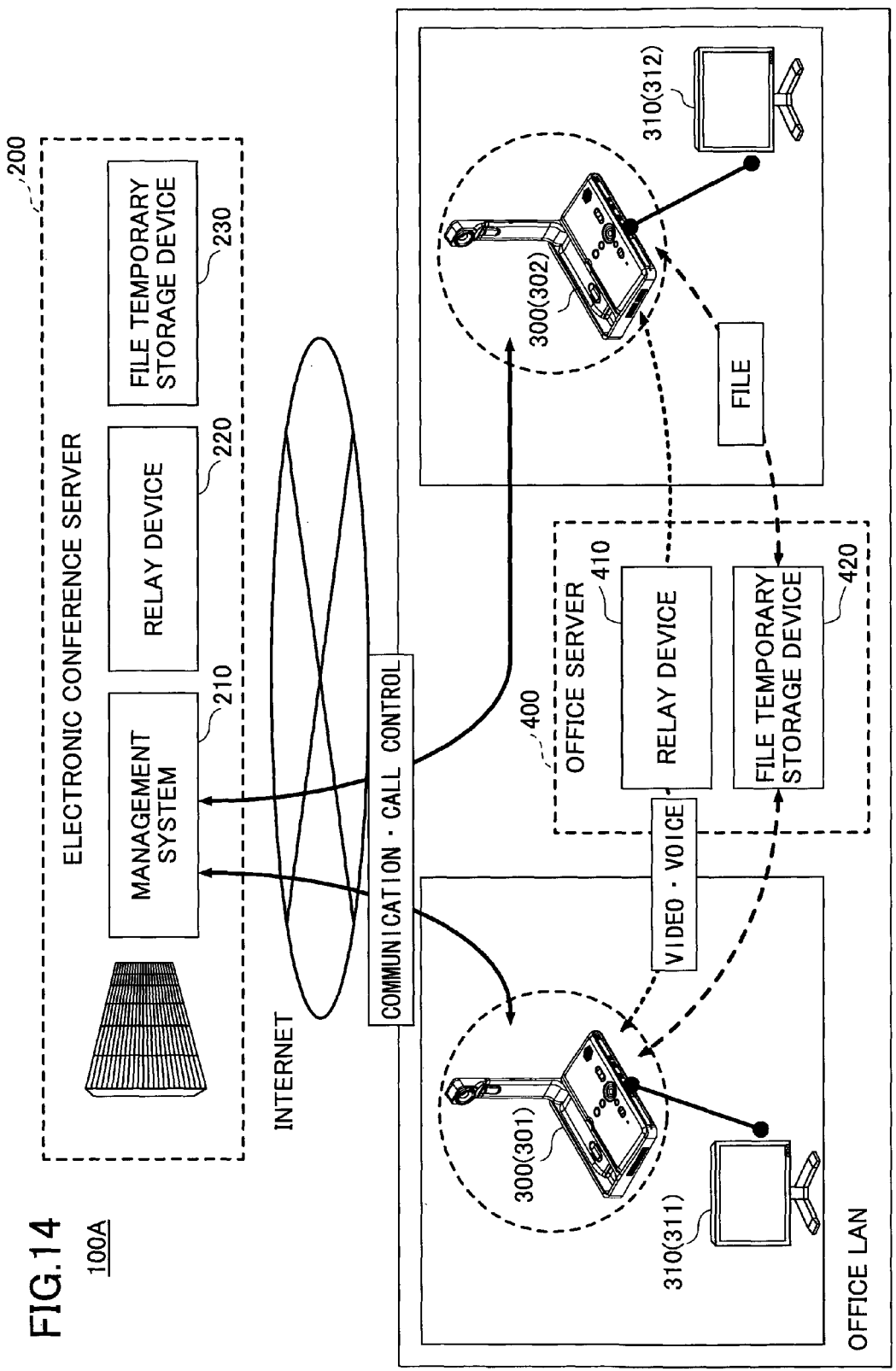
FIG. 14 is a drawing illustrating a configuration of an electronic conference system according to a second embodiment.

FIG. 14 illustrates a configuration of an electronic conference system according to the second embodiment. In the electronic conference system 100A according to the second embodiment, the electronic conference terminals 301 and 302 are connected to each other via an intranet such as an office LAN (Local Area Network) or the like. Further, an office server 400 is installed in the office, and a relay device 410 and a file temporary storage device 420 are also installed in the office. Here, the office server 400 may not be physically installed in the office, but may be an external server that is connected via a secure line based on a Virtual Private Network (VPN) or the like.

In the configuration of FIG. 14, the electronic conference terminals 301 and 302 may hold a conference so that no video and voice data are externally transmitted because the video and voice routers in the private network (intranet) can be used. In this case, by locating the file temporary storage device 420 in the office LAN as well, the security when files are shared may further be improved.

Figure 15:
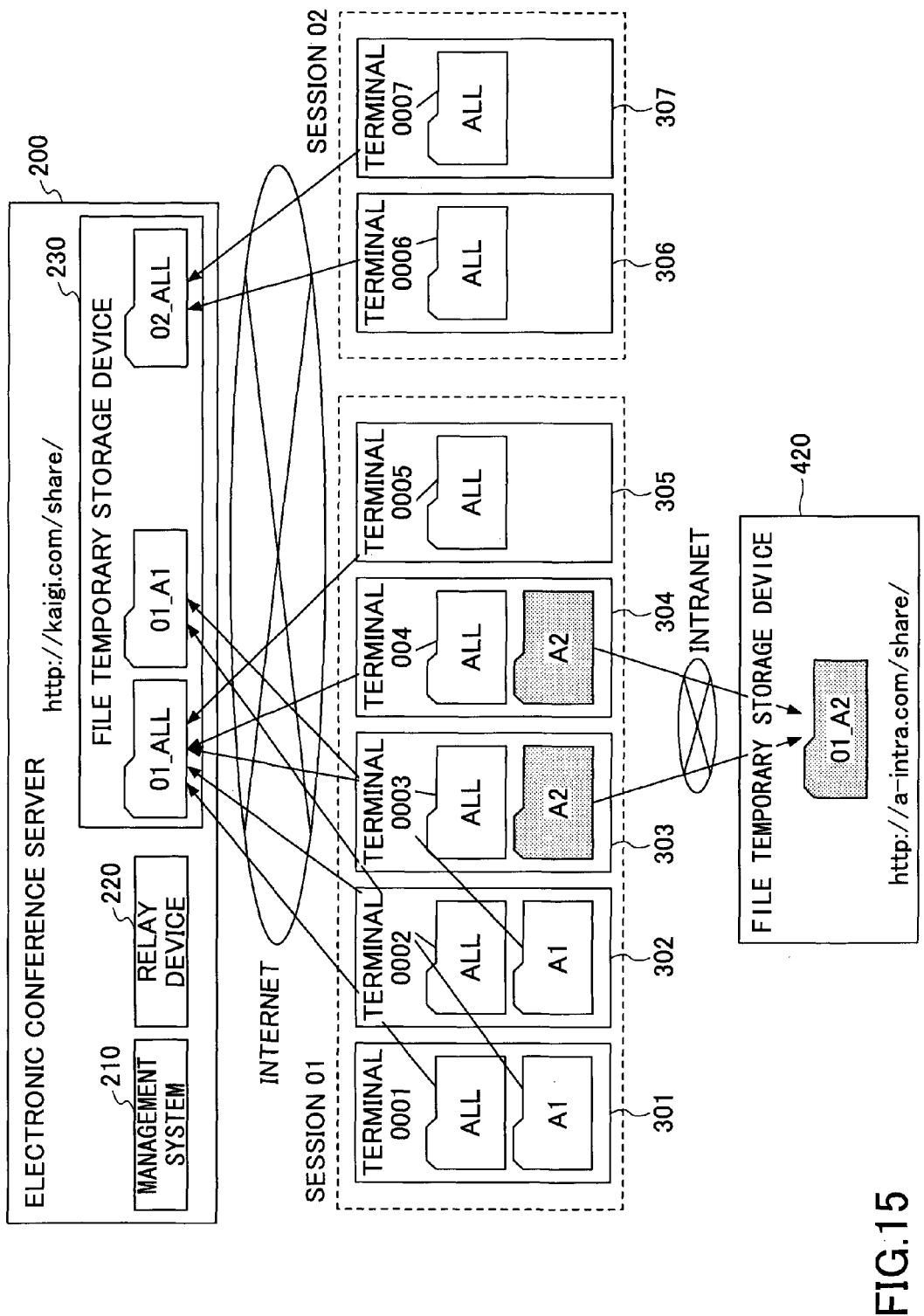
FIG. 15 a drawing illustrating the corresponding relationships between the electronic conference terminals and the shared folders according to the second embodiment.

FIG. 15 illustrates the corresponding relationships between the electronic conference terminals and the shared folders according to the second embodiment.

In the electronic conference system 100A in this embodiment, it is possible to generate the shared folders in the file temporary storage device 230 located via the Internet and the file temporary storage device 420 located in the intranet.

In the example of FIG. 15, the group shared folder corresponding to the group A2 to which the electronic conference terminals 303 and 304 belong is generated in the file temporary storage device 420 in the intranet. In this embodiment, for example, the terminal ID identifying the electronic conference terminal 300 may be managed in association with the connection type of the electronic conference terminal 300 in the terminal management table or the like.

In the following, the terminal management table according to this embodiment is described with reference to FIG. 16. FIG. 16 is an example of the terminal management table according to the second embodiment.

As shown in FIG. 16, the terminal management table 61 manages the terminal ID identifying the electronic conference terminals 300 in association with the connection type which is a network type through which the electronic conference terminals 300 are connected and the group name to which the electronic conference terminals 300 belong. Namely, in this embodiment, the network type and the group name refer to group identification data assigned to the electronic conference terminals 300.

Next, a network management table 90 in this embodiment is described with reference to FIG. 17. FIG. 17 is an example of the network management table according to the second embodiment.

In the network management table 90 in this embodiment, an intranet ID identifying the intranet is associated with an intranet URI which is data identifying the location of the intranet.

In this embodiment, the management system 210 generates the group shared folder by referring to the terminal management table 61 and the network (intranet) management table 90.

Figure 18:
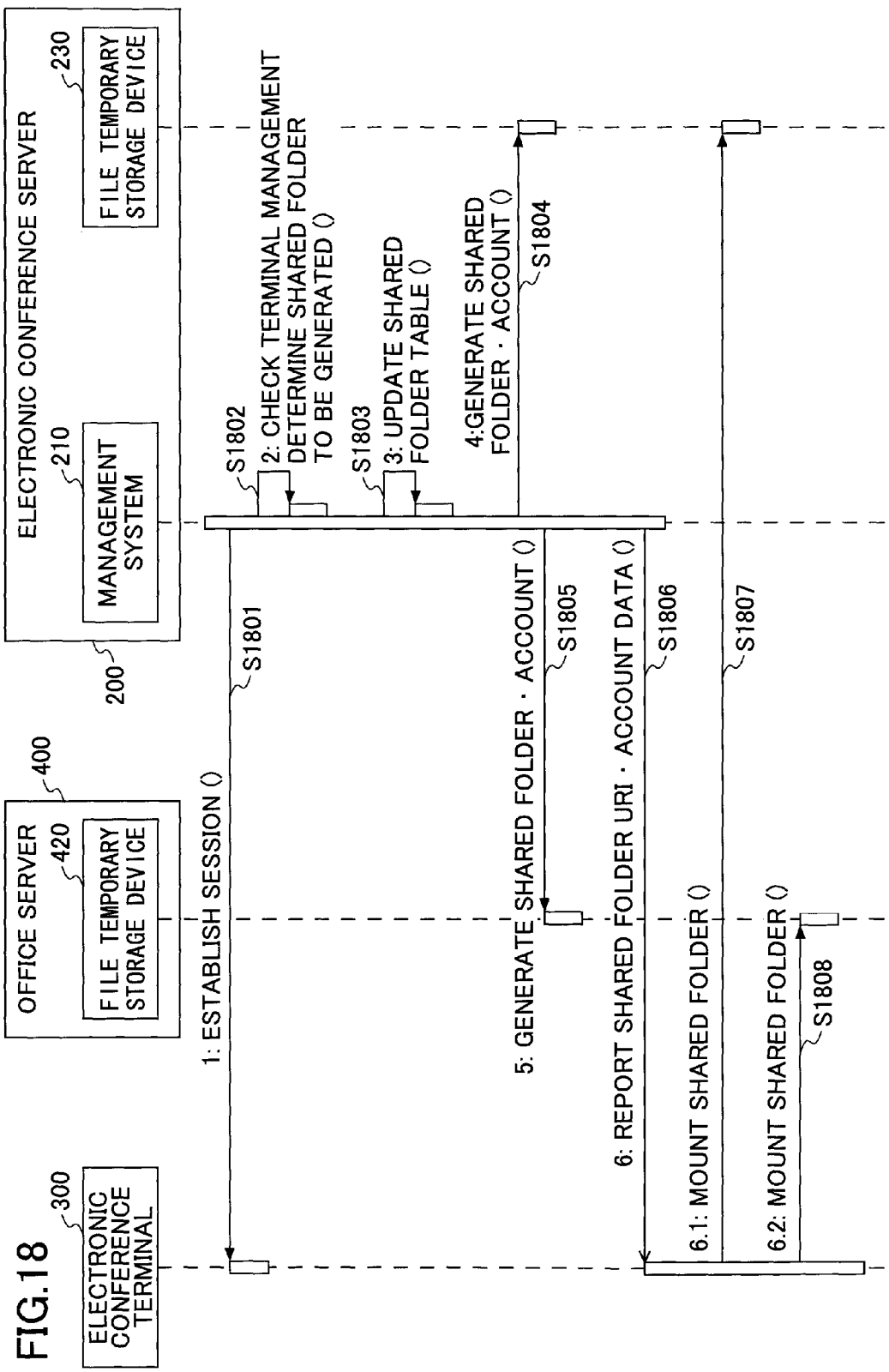
FIG. 18 is a sequence diagram illustrating an operation of the electronic conference server according to the second embodiment.

In the following, data transactions between the electronic conference server 200 and the electronic conference terminals 300 in the electronic conference system 100A according to this embodiment are described with reference to FIG. 18. FIG. 18 is a sequence diagram illustrating the operations of the electronic conference server 200 according to the second embodiment.

When the conference in the electronic conference system 100A according to this embodiment starts, the management system 210 of the electronic conference server 200 establishes a session with the electronic conference terminals 300 that are to participate in the conference (step S1801). Next, the management system 210 causes the terminal management section 231 to refer to the terminal management table 61 and determines the group shared folder to be generated (step S1802). Details of the process in step S1802 are described below.

When the group shared folder to be generated is determined in step S1802, the management system 210 causes the shared folder management section 232 to update the shared folder table 70 (step S1803). Next, the management system 210 causes the folder generation section 233 to generate the account of the group shared folder and the group shared folder in the file temporary storage device 230 (step S1804). Further, in this embodiment, in step S1804, besides the group shared folder, the folder generation section 233 may further generate a shared folder that is to be shared by all the electronic conference terminals 300 that participate in the same conference in the file temporary storage device 230.

Further, when the location where the group shared folder is generated is in the office server 400, the folder generation section 233 generates the account of the group shared folder and the group shared folder in the file temporary storage device 420 (step S1805).

Next, the management system 210 causes the communication section 235 to refer to the shared folder table 70 and report the shared folder URI of the shared folder and the shared folder URI of the group shared folder, and account data to be used for accessing the shared folder to the electronic conference terminals 300 (step S1806).

Next, the electronic conference terminal 300 mounts the shared folder and the group shared folder on the file temporary storage device 230 (step S1807). Further, the electronic conference terminal 300 mounts the group shared folder on the file temporary storage device 420 (step S1808).

Figure 19:
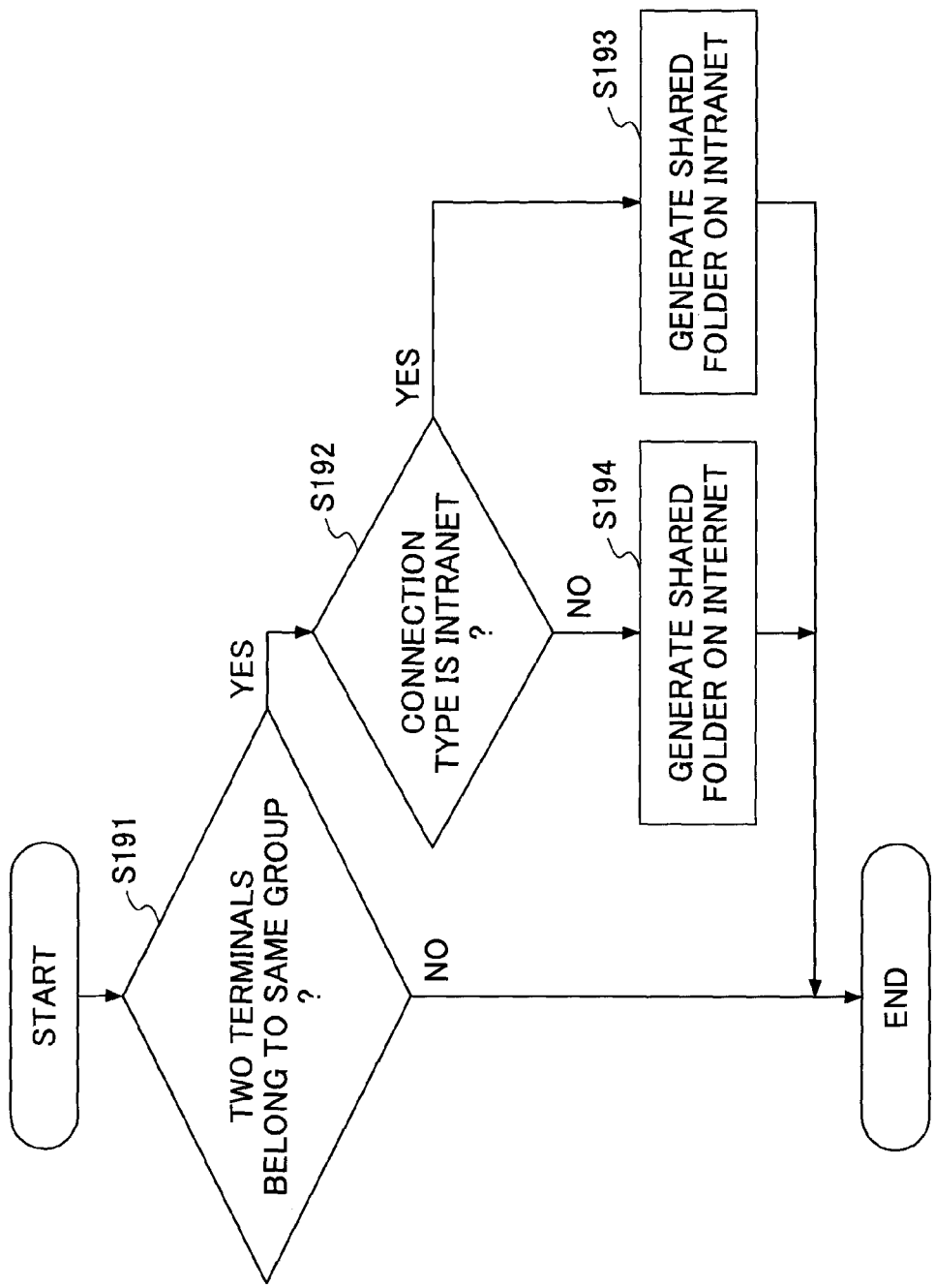
FIG. 19 is a flowchart illustrating a process of determining the shared folder to be generated in the second embodiment.

In the following, the process in step S1802 is described with reference to FIG. 19. FIG. 19 is a flowchart illustrating a process of determining the shared folder to be generated in the second embodiment.

The management system 210 according to this embodiment causes the determination section 234 to refer to the terminal management table 61 and determine whether there are electronic conference terminals 300 that belong to the same group among the electronic conference terminals 300 participating the same conference (step S191). When determining that there are electronic conference terminals 300 belonging to the same group in step S191, the management system 210 refers to the terminal management table 61 and determines whether the types of the networks to which the electronic conference terminals 300 of the same group belong are the same as each other (step S192). When it is determined that there are no electronic conference terminals 300 that belong to the same group in step S191, no group shared folder is generated and the process ends.

In step S192, when it is determined that the connection type is intranet, the management system 210 causes the folder generation section 233 to generate the group shared folder on the intranet (step S193). In step S192, when it is determined that the connection type is the Internet, the management system 210 generates the group shared folder on the Internet (step S194).

In the following, the process in FIG. 19 is specifically described with reference to FIGS. 7, 16 and 17. For example, a case is described where the electronic conference server 200 and the electronic conference terminals 301 and 302 are connected to participate in the conference of the session ID01 in this embodiment. Further, in this case, it is assumed that the session that is necessary for transmitting and receiving the content data between the electronic conference terminals 301 and 302 has already been established by the electronic conference server 200.

In this case, the management system 210 refers to the terminal management table 61 and acquires the group name corresponding to the terminal ID0002 of the electronic conference terminal 302. The group name is group A1. Next, the management system 210 determines whether there is a terminal that belong to the group A1 among the electronic conference terminals 300 participating in the session ID01. Here, the electronic conference terminal 301 belongs to the group A1.

Therefore, the management system 210 refers to the terminal management table 61 and determines whether the connection type of the electronic conference terminal 301 is the same as that of the electronic conference terminal 302. The connection type of the electronic conference terminal 301 is the Internet and the connection type of the electronic conference terminal 302 is also the Internet. Therefore, they have the same connection type. Therefore, the management system 210 generates the group shared folder to be shared by the electronic conference terminals 300 of the group A1 in the file temporary storage device 230. Further, the management system 210 reports the shared folder URI of the generated group shared folder and the account data thereof to the electronic conference terminals 301 and 302.

Next, a case is described where an electronic conference terminal 300 participates in the conference during the conference in the electronic conference system 100A according to this embodiment. The process in which the electronic conference terminal 300 participates in the conference during the conference in the electronic conference system 100A differs from the process in step S1802 of FIG. 18. Further, when it is not necessary to generate the group shared folder, the management system 210 performs only the update of the shared folder table 70 in step S1803.

Figure 20:
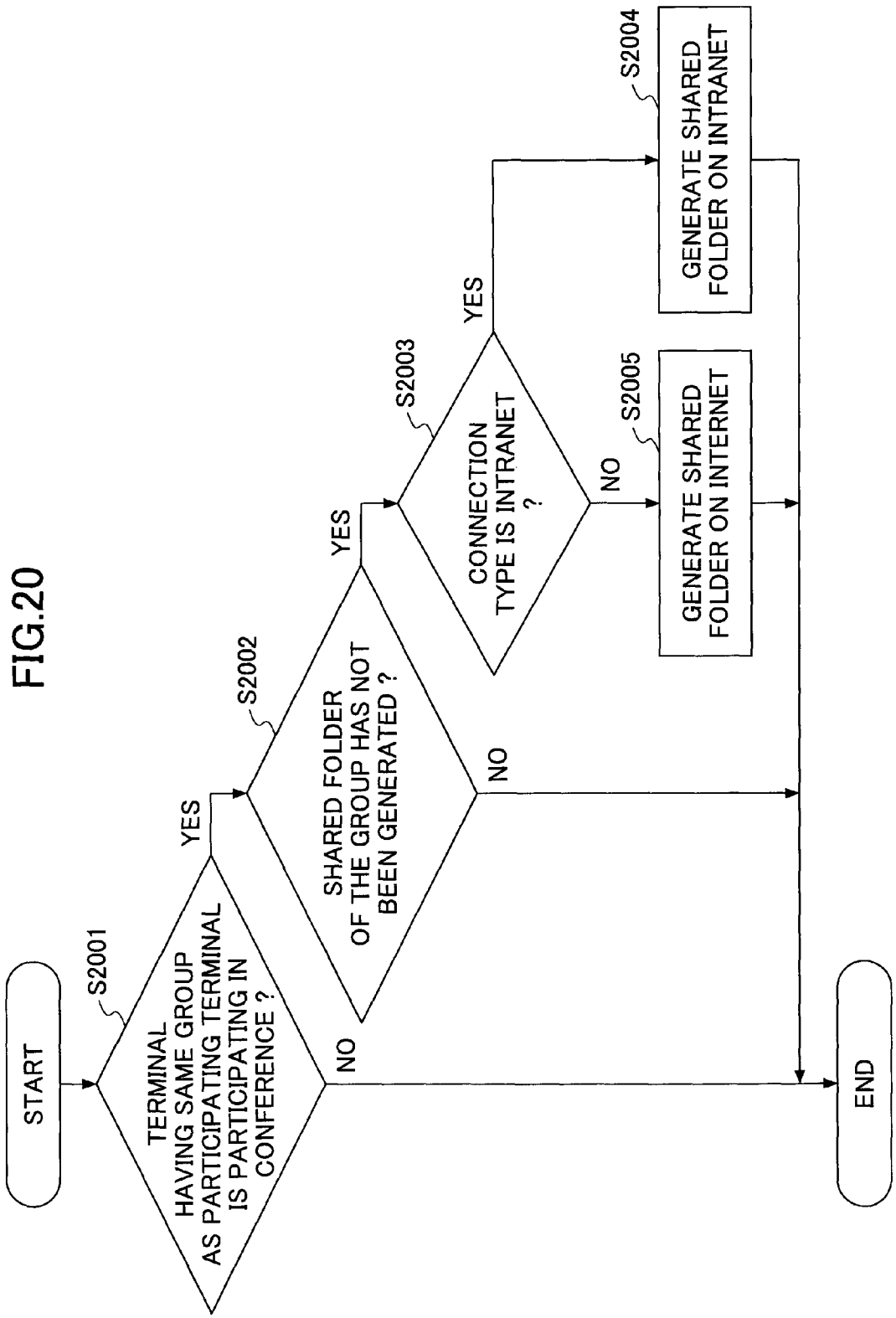
FIG. 20 is a flowchart illustrating a process of determining the shared folder to be generated when an electronic conference terminal participates during a conference according to the second embodiment.

In the following, the process is described when an electronic conference terminal 300 participates in the conference during the conference. FIG. 20 is a flowchart illustrating a process of determining the shared folder to be generated when an electronic conference terminal 300 participates in a conference during the conference according to the second embodiment.

In the electronic conference system 100A in this embodiment, when a session is established between the electronic conference terminals 300 that have already participated in a conference and the electronic conference terminal 300 that is to participate in the conference during the conference, the management system 210 of the electronic conference server 200 determines whether any of the electronic conference terminals 300, that belong to the same group as that of the electronic conference terminal 300 that is to participate in the conference during the conference, is participating in the conference (step S2001). Specifically, the management system 210 causes the determination section 234 to refer to the terminal management table 60 and the shared folder table 70 and determine whether there is an electronic conference terminal 300 belonging to the same group as that of the electronic conference terminal 300 that is to participate in the conference during the conference.

In step S2001, when it is determined that there is no electronic conference terminal 300 belonging to the same group as that of the electronic conference terminal 300 that is to participate in the conference during the conference, the management system 210 stops this process. On the other hand, when it is determined that there is an electronic conference terminal 300 belonging to the same group as that of the electronic conference terminal 300 that is to participate in the conference during the conference in step S2001, the management system 210 further determines whether a group shared folder has been generated in the file temporary storage device 230 or the file temporary storage device 420, the group shared folder corresponding to the group of the electronic conference terminal 300 that is to participate in the conference during the conference (step S2002).

In step S2002, when it is determined that the corresponding group shared folder exists, the management system 210 stops this process. On the other hand, in step S2002, when it is determined that there is no corresponding group shared folder, the management system 210 refers to the terminal management table 61 and determines whether the connection type of the electronic conference terminals 300 of the same group is intranet (step S2003).

In step S2003, when it is determined that the connection type is intranet, the management system 210 generates the group shared file on the intranet (step S2004). In step S2003, when it is determined that the connection type is other than intranet, the management system 210 generates the group shared file on the Internet (step S2005).

As described above, according to this embodiment, the location where the group shared file, that is shared by the electronic conference terminals 300 of the same group, is generated may be determined based on the type of the connection between the electronic conference terminals 300 and the file temporary storage device. In this embodiment, by doing this, the group shared file may be generated in the office server or the like on the intranet.

Accordingly, for example, in a case where a plurality of different companies holds a conference based on the electronic conference system 100A, the electronic conference terminals 300 for each of the companies are included in one group and the group shared folder corresponding to the group is generated in its office server. Further, in this embodiment, for example, the electronic conference terminals 300 may be divided in two groups. In one group, highly-confidential data are treated, and in the other group no highly-confidential data are treated. In this case, the former group and the corresponding group shared folder may be located on the intranet.

Therefore, according to this embodiment, the security level in sharing data may be improved.

Third Embodiment

Next, a third embodiment of the present invention is described with reference to the accompanying drawings. The third embodiment of the present invention differs from the first and the second embodiments in that the electronic conference terminal 300 is integrated with the PC 310 to provide an electronic conference terminal 300A. Therefore, in the following description according to the third embodiment of the present invention, only the configurations different from those in the first embodiment are described. Further, the same reference numerals are used to describe the elements having the same functions as those of elements in the first embodiment and repeated descriptions thereof may be omitted.

Figure 21:
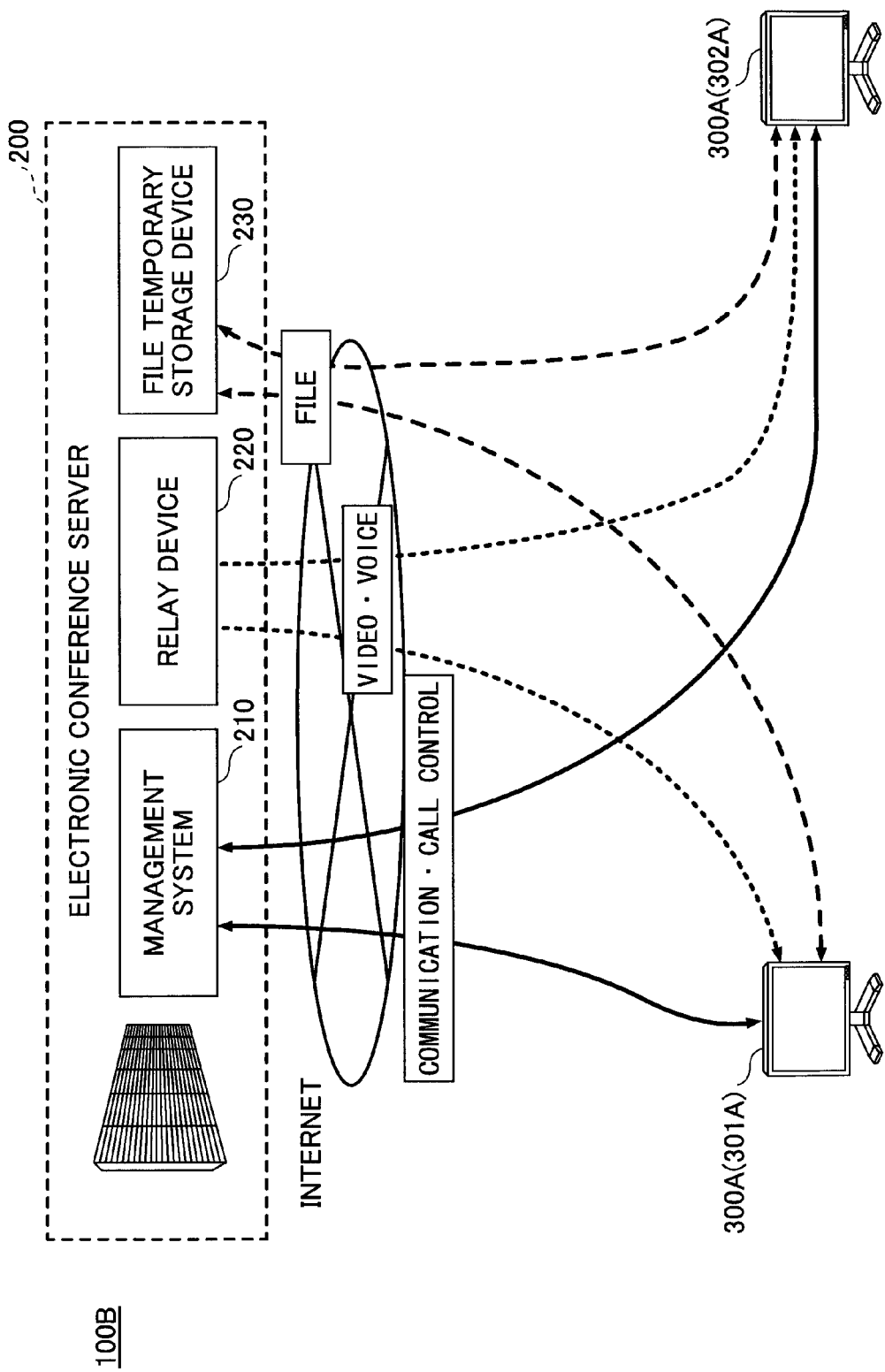
FIG. 21 is a drawing illustrating an electronic conference system according to a third embodiment.

FIG. 21 illustrates a configuration of an electronic conference system 100B according to the third embodiment. The electronic conference system 100B includes the electronic conference server 200 and two or more electronic conference terminals 300A.

For example, the electronic conference terminals 300A in this embodiment may be a general-purpose computer terminal having a microphone, a speaker, a camera and the like. In this embodiment, a general-purpose computer is used as the electronic conference terminal without using a terminal dedicated to electronic conferencing. Here, it is assumed that the general-purpose computer includes, for example, a smart phone, a cellular phone, a tablet terminal and the like.

Further, in this embodiment, the electronic conference terminals 300A are divided into groups based on data indicating the attributes of the electronic conference terminals 300A. Namely, in this embodiment, the data indicating the attributes of the electronic conference terminals 300A correspond to the group identification data given to the electronic conference terminals 300A.

FIG. 22 is an example of a terminal management table 62 according to the third embodiment.

In the terminal management table 62 of FIG. 22, the terminal IDs identifying the electronic conference terminals 300A are managed in association with the first and the second attribute data of the electronic conference terminals 300A.

In this embodiment, it is assumed that the terminal ID includes the user ID set in the electronic conference terminal 300A and the first attribute refers to the name of the facility where the user belongs, the user corresponding to the user ID, and the second attribute refers to a name of the division where the user belongs, the user corresponding to the user ID.

Further, in this embodiment, any data that identify the electronic conference terminal 300A may be used in place of the terminal ID. Namely, when the data may be used to identify the electronic conference terminal 300A, the data may be used as a key that corresponds to the first and the second attribute data in the terminal management table 62.

Specifically, for example, in the management system 210, the user ID is stored in association with the data identifying the electronic conference terminal 300A that is used by the user, so that the electronic conference terminal 300A may be identified based on the user ID. As the data identifying the electronic conference terminal 300A, for example, the terminal ID or the data indicating the location of the terminal (e.g., IP address or the like) may be used.

In this embodiment, for example, the management system 210 may treat the electronic conference terminals 300A in the same division name and the same facility name as the terminals belonging to the same group.

In the example of FIG. 22, the electronic conference terminal 300A of the user ID1 and the electronic conference terminal 300A of the user ID2 correspond to the same division name and the same facility name. Therefore, the management system 210 may treat those two electronic conference terminals 300A as the terminals belonging to the same group and generate the corresponding group shared file.

Further, in this embodiment, when the electronic conference terminals 300A correspond to the same division name alone, the electronic conference terminals 300A may be treated as the terminals belonging to the same group.

As described above, in this embodiment, the data to be used for dividing the electronic conference terminals 300A into groups may be treated as the attribute data, so that the group shared file may be generated based on the attribute data.

Further, in the above embodiments, each of the relay device, the management system, and the file temporary storage device may be a single computer or a plurality of computers (information processing apparatuses) for corresponding units (functions and means).

Further, in the above descriptions, a case of a television conference system is described as an example of a communication system. However, the present invention is not limited to this application. The communication system in each embodiment may also be applied to, for example, telephone systems including an Internet Protocol (IP) telephone, the Internet telephone and the like. Further, the communication system in each embodiment may also be applied to, for example, a cellular-phone based communication system. In this case, for example, the electronic conference terminal corresponds to the cellular phone.

Further, in the above embodiments, a case is described where a television conference is held based on the communication system. However, the present invention is not limited to this application. Namely, the present invention may also be applied to, for example, a meeting, general conversations between families or friends or the like, and one-directional data presentation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application Nos. 2012-200912 filed Sep. 12, 2012, and 2013-160528 filed Aug. 1, 2013, the entire contents of which are hereby incorporated herein by reference.

DESCRIPTION OF THE REFERENCE NUMERALS 100, 100A, 100B: ELECTRONIC CONFERENCE SYSTEM
200: ELECTRONIC CONFERENCE SERVER
210: MANAGEMENT SYSTEM
220,410: RELAY DEVICE
230,420: FILE TEMPORARY STORAGE DEVICE
231: TERMINAL MANAGEMENT SECTION
232: SHARED FOLDER MANAGEMENT SECTION
233: FOLDER GENERATION SECTION
234: DETERMINATION SECTION
235: COMMUNICATION SECTION
300,300A: ELECTRONIC CONFERENCE TERMINAL
400: OFFICE SERVER

PATENT DOCUMENTS

Patent Document 1: Japanese Laid-Open Patent Application No. 2011-254453

The invention claimed is:

1. A communication server being connected with a plurality of communication terminals transmitting and receiving content data and managing communications between the plurality of communication terminals, the communication server comprising:

a memory storing data identifying each communication terminal of the plurality of communication terminals in association with group identification data identifying a group to which the communication terminal belongs; and processing circuitry configured to after a session for transmitting and receiving the content data is established between a first communication terminal and a second communication terminal included in the plurality of communication terminals, determine whether group identification information of the first communication terminal in the session and group identification information of the second communication terminal in the session are a same as each other based on the group identification data; and when it is determined, after the session is established, that the group identification information of the first communication terminal and the group identification information of the second communication terminal are the same as each other, report shared location information, indicating a location of a shared memory area to be shared between the first and the second communication terminals, to the first and the second communication terminals in the session, wherein the shared memory area shared by the first and second communication terminals is provided in a memory device connected to the communication server; and the processing circuitry is further configured to, when a connection with the first and the second communication terminals participating the session is terminated due to an end of the session, determine whether the shared memory area corresponding to the group is to be deleted based on a deletion table, wherein the deletion table associates the group identification data with data indicating whether the shared memory area is to be deleted from the memory device.

2. The communication server according to claim 1, wherein the processing circuitry is further configured to manage session identification data identifying the session in association with the shared location information, data identifying each of the first and the second communication terminals using the shared memory area, and the group identification data indicating the group to which the first and the second communication terminals both belong, the first and the second communication terminals using the shared memory area.

3. The communication server according to claim 1, wherein the group identification data managed by the processing circuitry includes connection type data indicating whether each of the communication terminals is connected to the Internet or an intranet.

4. A communication system, comprising:
a first communication terminal;
a second communication terminal; and
processing circuitry configured to
manage data identifying each communication terminal of a plurality of communication terminals in association with group identification data identifying a group to which the communication terminal belongs, the plurality of communication terminals including the first and second communication terminals;
after a session for transmitting and receiving the content data is established between the first communication terminal and the second communication terminal, determine whether group identification information of the first communication terminal in the session and group identification information of the second communication terminal in the session are a same as each other based on the group identification data; and when it is determined, after the session is established, that the group identification information of the first communication terminal and the group identification information of the second communication terminal are the same as each other, report shared location information, indicating a location of a shared memory area to be shared between the first and the second communication terminals, to the first and the second communication terminals in the session, wherein the shared memory area shared by the first and second communication terminals is provided in a memory device connected to the communication server; and the processing circuitry is further configured to, when a connection with the first and the second communication terminals participating the session is terminated due to an end of the session, determine whether the shared memory area corresponding to the group is to be deleted based on a deletion table, wherein the deletion table associates the group identification data with data indicating whether the shared memory area is to be deleted from the memory device.

5. A communication method for a communication server connected with a plurality of communication terminals participating in a conference and managing communications between the plurality of communication terminals, the method comprising:

managing, by the communication server, data identifying each communication terminal of the plurality of communication terminals in association with group identification data identifying a group to which the communication terminal belongs;

determining, by the communication server, after a session for transmitting and receiving the content data is established between a first communication terminal and a second communication terminal included in the plurality of communication terminals, whether group identification information of the first communication terminal in the session and group identification information of the second communication terminal in the session are a same as each other based on the group identification data; and reporting, by the communication server, when it is determined in the determining step, after the session is established, that the group identification information of the first communication terminal and the group identification information of the second communication terminal are the same as each other, shared location information, indicating a location of a shared memory area to be shared between the first and the second communication terminals, to the first and the second communication terminals in the session, wherein the shared memory area is provided in a memory device connected to the communication server; and in the determining step, when a connection with the first and the second communication terminals participating the session is terminated due to an end of the session, the method further includes determining whether the shared memory area corresponding to the group is to be deleted based on a deletion table, wherein the deletion table associates the group identification data with data indicating whether the shared memory area is to be deleted from the memory device.

6. The communication method according to claim 5, further comprising:

managing, by the communication server, session identification data identifying the session in association with the shared location information, data identifying each of the first and the second communication terminals using the shared memory area, and the group identification data indicating the group to which both the first and the second communication terminals belong, the first and the second communication terminals using the shared memory area.

7. The communication method according to claim 5, wherein the group identification data includes connection type data indicating whether each of the communication terminals is connected to the Internet or an intranet.

8. The communication server of claim 1, further comprising: a relay communication circuit configured to transmit and receive the content data, wherein the memory stores a sharing folder shared between the plurality of communication terminals.

* * * * *